US008441503B2

(12) United States Patent
Isobe et al.

(10) Patent No.: US 8,441,503 B2
(45) Date of Patent: May 14, 2013

(54) LIGHTING PERIOD SETTING METHOD, DISPLAY PANEL DRIVING METHOD, BACKLIGHT DRIVING METHOD, LIGHTING CONDITION SETTING DEVICE, SEMICONDUCTOR DEVICE, DISPLAY PANEL AND ELECTRONIC EQUIPMENT

(75) Inventors: Teppei Isobe, Kanagawa (JP); Hiroshi Hasegawa, Kanagawa (JP); Hironobu Abe, Kanagawa (JP)

(73) Assignee: Sony Corporation, Tokyo (JP)

( * ) Notice: Subject to any disclaimer, the term of this patent is extended or adjusted under 35 U.S.C. 154(b) by 1002 days.

(21) Appl. No.: 12/320,959

(22) Filed: Feb. 10, 2009

(65) Prior Publication Data

US 2009/0207193 A1 Aug. 20, 2009

(30) Foreign Application Priority Data

Feb. 14, 2008 (JP) ................................ 2008-032524

(51) Int. Cl.

| | |
|---|---|
| ***G09G 5/10*** | (2006.01) |
| ***G09G 3/36*** | (2006.01) |
| ***G09G 3/30*** | (2006.01) |
| ***G06F 3/038*** | (2006.01) |

(52) U.S. Cl.

USPC .............. 345/690; 345/76; 345/102; 345/204

(58) Field of Classification Search .......... 345/690–691, 345/76–77, 102, 204

See application file for complete search history.

(56) References Cited

U.S. PATENT DOCUMENTS

| | | | | |
|---|---|---|---|---|
| 7,173,599 | B2 * | 2/2007 | Nishimura | 345/102 |
| 7,413,331 | B2 | 8/2008 | Hatanaka et al. | |
| 2002/0057238 | A1 * | 5/2002 | Nitta et al. | 345/87 |
| 2004/0041751 | A1 * | 3/2004 | Takahashi | 345/76 |
| 2004/0246242 | A1 * | 12/2004 | Sasaki | 345/204 |
| 2005/0259064 | A1 * | 11/2005 | Sugino et al. | 345/102 |
| 2006/0146005 | A1 * | 7/2006 | Baba et al. | 345/102 |
| 2006/0232717 | A1 * | 10/2006 | Kervec et al. | 348/761 |
| 2006/0279523 | A1 * | 12/2006 | Nitta et al. | 345/102 |
| 2007/0126672 | A1 * | 6/2007 | Tada et al. | 345/77 |
| 2008/0191642 | A1 * | 8/2008 | Slot et al. | 315/295 |
| 2008/0284719 | A1 * | 11/2008 | Yoshida | 345/102 |
| 2009/0122087 | A1 * | 5/2009 | Maruyama et al. | 345/690 |
| 2009/0169215 | A1 * | 7/2009 | Sauerlander et al. | 398/118 |
| 2010/0085341 | A1 * | 4/2010 | Hasegawa et al. | 345/208 |
| 2010/0149167 | A1 * | 6/2010 | Hasegawa et al. | 345/213 |

FOREIGN PATENT DOCUMENTS

| | | | |
|---|---|---|---|
| JP | 2002-075038 | | 3/2002 |
| JP | 2005-107181 | | 4/2005 |
| JP | 2005-122070 | A | 5/2005 |
| JP | 2006-030516 | A | 2/2006 |
| JP | 2006-189661 | A | 7/2006 |
| JP | 2006-259624 | A | 9/2006 |
| JP | 2006-323234 | A | 11/2006 |

* cited by examiner

*Primary Examiner* — Bipin Shalwala
*Assistant Examiner* — Matthew Fry
(74) *Attorney, Agent, or Firm* — Rader, Fishman & Grauer PLLC

(57) ABSTRACT

Disclosed herein is a lighting period setting method for a display panel which permits control of the peak luminance level by controlling the total lighting period length which is the sum of all lighting periods per field period, the lighting period setting method including the steps of, calculating the average luminance level across the screen based on input image data, determining light emission mode based on the calculated average luminance level, and setting the number, arrangement and lengths of lighting periods per field period according to the setting conditions defined for the determined light emission mode so as to provide the peak luminance level which is set according to the input image data.

18 Claims, 29 Drawing Sheets

FIG. 12

| | | | | | | | |
|---|---|---|---|---|---|---|---|
| 1 | 2 | 3 | 4 | 5 | 6 | 7 | 8 |
| 9 | 10 | 11 | 12 | 13 | 14 | 15 | 16 |
| 17 | 18 | 19 | 20 | 21 | 22 | 23 | 24 |
| 25 | 26 | 27 | 28 | 29 | 30 | 31 | 32 |
| 33 | 34 | 35 | 36 | 37 | 38 | 39 | 40 |
| 41 | 42 | 43 | 44 | 45 | 46 | 47 | 48 |

171

LIGHTING PERIOD SETTING METHOD, DISPLAY PANEL DRIVING METHOD, BACKLIGHT DRIVING METHOD, LIGHTING CONDITION SETTING DEVICE, SEMICONDUCTOR DEVICE, DISPLAY PANEL AND ELECTRONIC EQUIPMENT

CROSS REFERENCES TO RELATED APPLICATIONS

The present invention contains subject matter related to Japanese Patent Application JP 2008-032524 filed in the Japan Patent Office on Feb. 14, 2008, the entire contents of which being incorporated herein by reference.

FIELD OF THE INVENTION

The invention described in this specification relates to a technique for controlling the peak luminance level of a display panel.

It should be noted that the invention has aspects of a lighting period setting method, display panel driving method, backlight driving method, lighting condition setting device, semiconductor device, display panel and electronic equipment.

DESCRIPTION OF THE RELATED ART

Liquid crystal panels have become widespread at a remarkable pace in recent years, finding application in a number of products. It should be noted, however, that these panels do not necessarily offer a fast motion image response speed. Therefore, today's liquid crystal panels incorporate countermeasure techniques such as backlight blinking and half frame rate. As a result, the motion image display characteristics of liquid crystal panels are on their way to improvement.

Incidentally, organic EL (Electro Luminescence) panels are drawing attention as next-generation flat panels for their fast response speed and excellent motion image display characteristics. An organic EL panel is a so-called self-luminous display panel in which the pixels themselves emit light. This ensures high performance in the display of a motion image.

[Patent Document 1]

Japanese Patent Laid-Open No. 2002-75038

[Patent Document 2]

Japanese Patent Laid-Open No. 2005-107181

SUMMARY OF THE INVENTION

As mentioned earlier, an organic EL panel offers excellent motion image response. However, flicker tends to be conspicuous in this type of panel because of its fast motion image response. For example, if a video signal is displayed at a low frame (or field) frequency, flicker is readily visible in an organic EL panel. It should be noted that this problem also holds true for a liquid crystal panel with improved motion image response.

Thus, the types of display panels giving priority to motion image response are subject to display quality degradation resulting from flicker. On the other hand, other types of display panels giving priority to countermeasures against flicker are subject to display quality degradation resulting from degradation in motion image response. That is, reduced flicker runs counter to improved motion image response.

Moreover, a wide variety of video signals, from still image to motion image, are displayed on a display panel. Therefore, it is difficult at present to set driving conditions suited to all images. On the other hand, flicker is known to be visible in different ways depending on the frame frequency of the video signal.

However, the frame frequency also changes significantly depending on the location of use and input signal type. Therefore, a larger circuit scale and higher price are inevitable in order to achieve a driving system which factors in all the conditions.

Therefore, the inventors propose a variety of driving techniques given below.

(A) Lighting Period Setting Method

The inventors propose a light period setting method which includes the steps described below. This method is proposed as a lighting period setting method for a display panel which permits control of the peak luminance level by controlling the total lighting period length which is the sum of all lighting periods per field period.

(a) Step of calculating the average luminance level across the screen based on the input image data (b) Step of determining the light emission mode based on the calculated average luminance level (c) Step of setting the number, arrangement and lengths of lighting periods per field period according to the setting conditions defined for the determined light emission mode so as to provide the peak luminance level which is set according to the input image data It should be noted that the term "lighting period" refers to the period of time during which the light-emitting element is lit per field period. That is, the term "lighting period" refers to the period of time during which an image is displayed on screen. Therefore, there may be not only one but a plurality of lighting periods per field period. FIGS. 1A to 1D illustrate examples in which there is only one lighting period per field period. The shaded areas in FIGS. 1A to 1D represent the lighting periods.

In the present specification, the term "lighting period length" refers to the length of each of the lighting periods. In the case of 1A to 1D, there is only one lighting period. Therefore, the lighting period length matches the total lighting period length.

Incidentally, FIG. 1A illustrates an example in which the total lighting period length accounts for several % of one field period. FIG. 1B illustrates an example in which the total lighting period length accounts for 25% of one field period. FIG. 1C illustrates an example in which the total lighting period length accounts for 50% of one field period. FIG. 1D illustrates an example in which the total lighting period length accounts for 75% of one field period.

In general, the shorter the total lighting period length, the higher the motion image response. On the other hand, the longer the total lighting period length, the less visible flicker becomes. It should be noted, however, that if a plurality of lighting periods are provided per field period (if the total lighting period length is set as the sum of a plurality of lighting periods), the motion image response characteristics and flicker visibility will change according to not only the total lighting period length but also the manner in which the lighting periods are arranged.

On the other hand, controlling the total lighting period length makes it possible to control the peak luminance level. FIG. 2 illustrates the relationship between the total lighting period length and peak luminance level. As illustrated in FIG. 2, the difference in total lighting period length leads to a change in luminance level even for the same signal potential. This change in luminance level is independent of the change in luminance level based on gray level information. The present specification assumes a display panel which permits control of such secondary luminance.

Incidentally, the light-emission mode described earlier should preferably be a motion image emphasis mode, balanced mode or flicker emphasis mode. The reason for this is that a video signal can be classified into any one of the three.

On the other hand, the setting method should preferably perform the following steps:

(d) Step of detecting a region having a given luminance level or more and a given area or more in one screen (e) Step of detecting the flicker component level in a display image based on detection result (f) Step of adjusting the light emission mode determination based on the detected level These steps are used because flicker is readily perceived in a region having a given luminance level or more and a given area or more.

Further, adjusting the light emission mode determination based on the detection result provides improved determination accuracy.

Still further, the setting method described earlier should preferably include a step of adjusting the thresholds for the light emission mode determination based on the type of input image data. This adjustment of the determination thresholds provides determination improved accuracy.

(B) Display Panel Driving Method

Further, the inventors propose a display panel driving method which includes the aforementioned lighting period setting steps and a step of driving a pixel array section so as to provide the set period length. This method is proposed as a driving method of a display panel whose peak luminance level is changed by controlling the total lighting period length which is the sum of all lighting periods per field period.

(C) Backlight Driving Method

Still further, the inventors propose a backlight driving method which includes the aforementioned lighting period setting steps and a step of driving a backlight so as to provide the set period length. This method is proposed as a backlight driving method for a display panel whose peak luminance level is changed by controlling the total lighting period length which is the sum of all lighting periods per field period.

(D) Lighting Condition Setting Device and Other Device

Still further, the inventors propose a lighting condition setting device which includes a function section. The function section configured to perform the aforementioned lighting period setting steps. The lighting condition setting device may be formed not only on a semiconductor substrate but also on an insulating substrate. It should be noted that the lighting condition setting device should preferably be a semiconductor device.

(E) Display Panel 1

Still further, the inventors propose a display panel which includes the devices described below. The peak luminance level of the display panel is variably controlled by controlling the total lighting period length which is the sum of all lighting periods per field period.

(a) Pixel array section having a pixel structure appropriate for active matrix driving (b) Luminance level calculation portion configured to calculate the average luminance level across the screen based on input image data (c) Light emission mode determination unit configured to determine the light emission mode based on the calculated average luminance level (d) Lighting period setting unit configured to set the number, arrangement and lengths of lighting periods per field period according to the setting conditions defined for the determined light emission mode so as to provide the peak luminance level which is set according to the input image data (e) Panel drive section configured to drive the pixel array section so as to provide the set period length Here, the pixel array section has a pixel structure in which EL elements are arranged in a matrix form. The panel drive section operates to set the lighting periods of the EL elements.

(F) Display Panel 2

Still further, the inventors propose a display panel which includes the devices described below. The peak luminance level of the display panel is variably controlled by controlling the total lighting period length which is the sum of all lighting periods per field period.

(a) Pixel array section having a pixel structure appropriate for active matrix driving (b) Luminance level calculation portion configured to calculate the average luminance level across the screen based on input image data (c) Light emission mode determination unit configured to determine the light emission mode based on the calculated average luminance level (d) Lighting period setting unit configured to set the number, arrangement and lengths of lighting periods per field period according to the setting conditions defined for the determined light emission mode so as to provide the peak luminance level which is set according to the input image data (e) Backlight drive section configured to drive the backlight source so as to provide the set period length (G) Electronic Equipment In addition to the above, the inventors propose electronic equipment having the above-described display panel.

Here, the electronic equipment includes a display panel module, system control section configured to control the operation of the system as a whole, and operation input section configured to accept operation inputs to the system control section.

It should be noted that this display panel includes two types of display panels described earlier.

The drive techniques proposed by the inventors make it possible to set the number, arrangement and lengths of lighting periods per field period according to the input image brightness and characteristics. This provides lighting control appropriate to input image even if the peak luminance level is adjusted over a wide range.

BRIEF DESCRIPTION OF THE DRAWINGS

FIG. 12 is a diagram illustrating an example of setting blocks;

DETAILED DESCRIPTION OF THE PREFERRED EMBODIMENTS

Figures 1A, 1B, 1C, 1D:
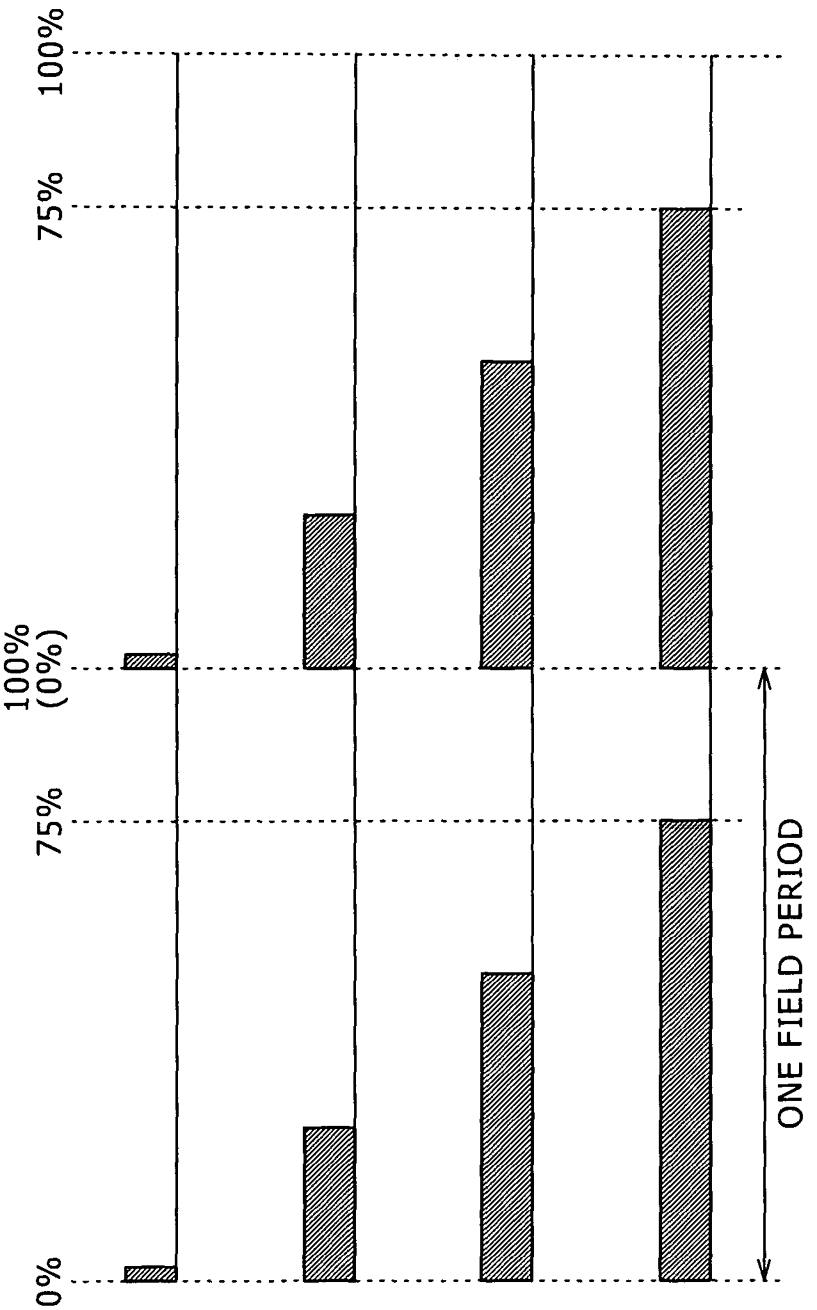
FIGS. 1A to 1D are diagrams illustrating the relationship between one field period and lighting periods.
Figure 2:
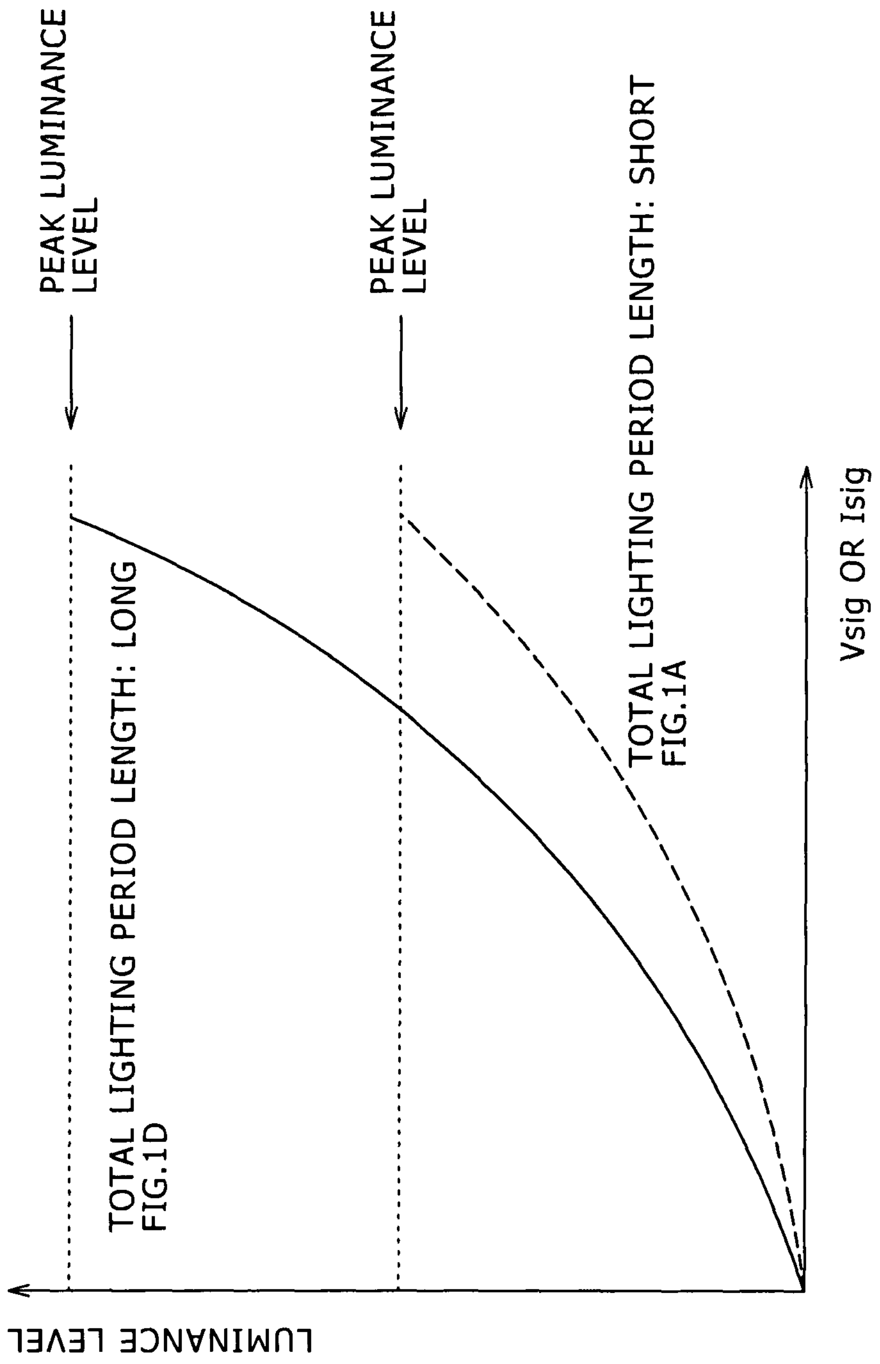
FIG. 2 is a diagram describing the relationship between a total lighting period length and peak luminance level.

A description will be given below of cases in which the invention proposed by the present specification is applied to an active-matrix-driven organic EL panel.

It should be noted that well-known or publicly known techniques of the pertaining technical field are used for the details not illustrated in the drawings or described in the specification.

It should also be noted that the embodiments described below are merely preferred embodiments of the present invention and that the invention is not limited thereto.

(A) Appearance and Structure of the Organic EL Panel

In the present specification, a display panel is referred to as such not only if the panel includes a pixel array section and drive circuits (e.g., control line drive section, signal line drive section and lighting condition setting section) formed on the same substrate but also if, for example, the panel includes drive circuits, manufactured for use as an IC for specific application, and a pixel array section formed on the same substrate.

Figure 3:
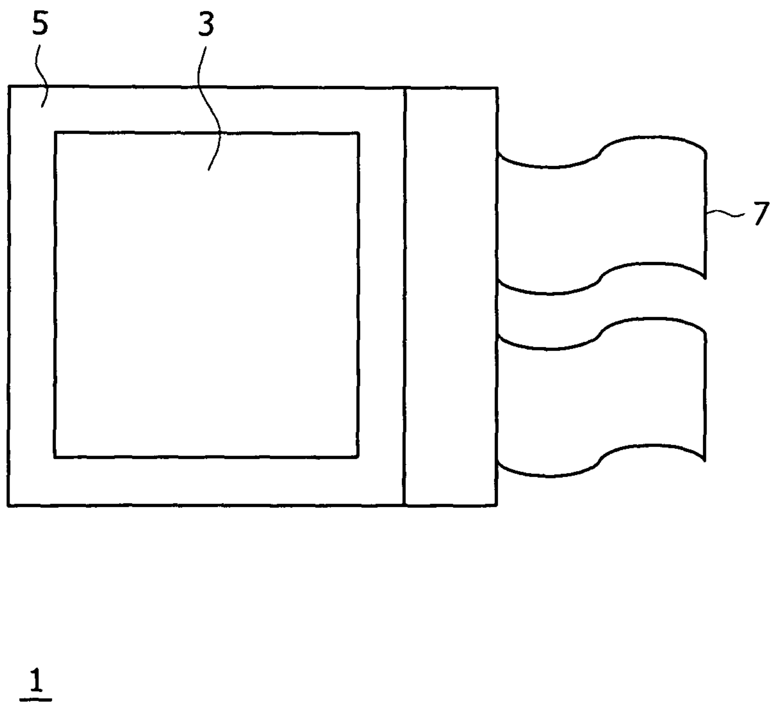
FIG. 3 is a diagram illustrating an appearance example of an organic EL panel.

FIG. 3 illustrates an appearance example of an organic EL panel. An organic EL panel 1 has a support substrate 3 and opposed substrate 5. The substrates 3 and 5 are attached to each other.

The support substrate 3 is made of glass, plastic or other base material. If the organic EL panel is a top emission panel, the pixel circuits are formed on the surface of the support substrate 3. That is, the support substrate 3 corresponds to a circuit substrate.

On the other hand, if the organic EL panel is a bottom emission panel, the organic EL elements are formed on the surface of the support substrate 3. That is, the support substrate 3 corresponds to a sealing substrate.

The opposed substrate 5 is also made of glass, plastic or other transparent base material. The opposed substrate 5 is a member configured to seal the surface of the support substrate 3, with a sealing material sandwiched between the opposed substrate 5 and support substrate 3. It should be noted that if the organic EL panel is a top emission panel, the opposed substrate corresponds to a sealing substrate. If the organic EL panel is a bottom emission panel, the opposed substrate corresponds to a circuit substrate.

It should be noted that only the substrate on the emitting side must be transparent. The substrate on the other side may be opaque.

In addition to the above, the organic EL panel 1 includes, as necessary, an FPC (flexible printed circuit) 7 to receive external signals and drive power.

(B) Embodiment 1

(B-1) System Configuration

Figure 4:
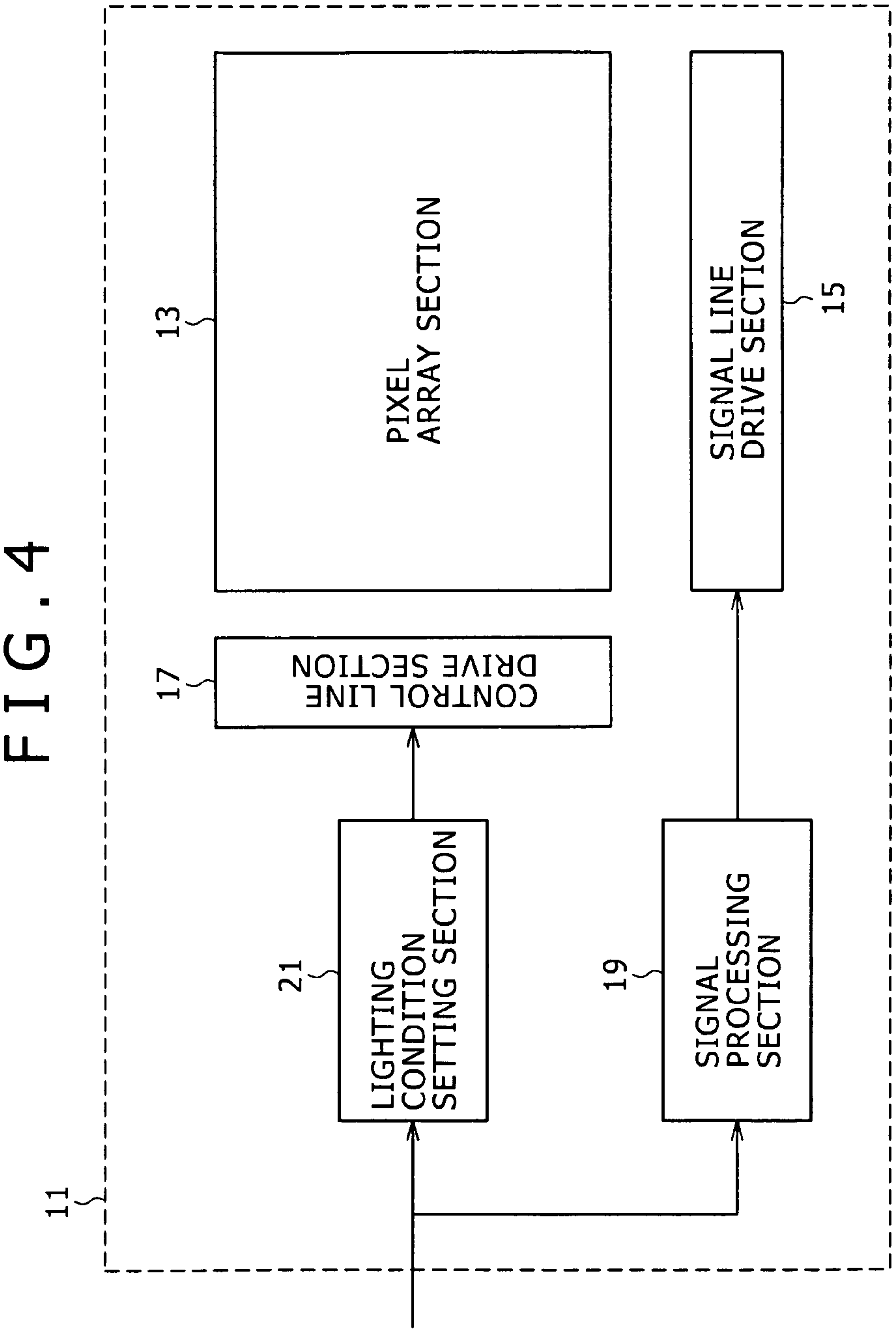
FIG. 4 is a diagram illustrating a system configuration example of the organic EL panel.
Figure 5:
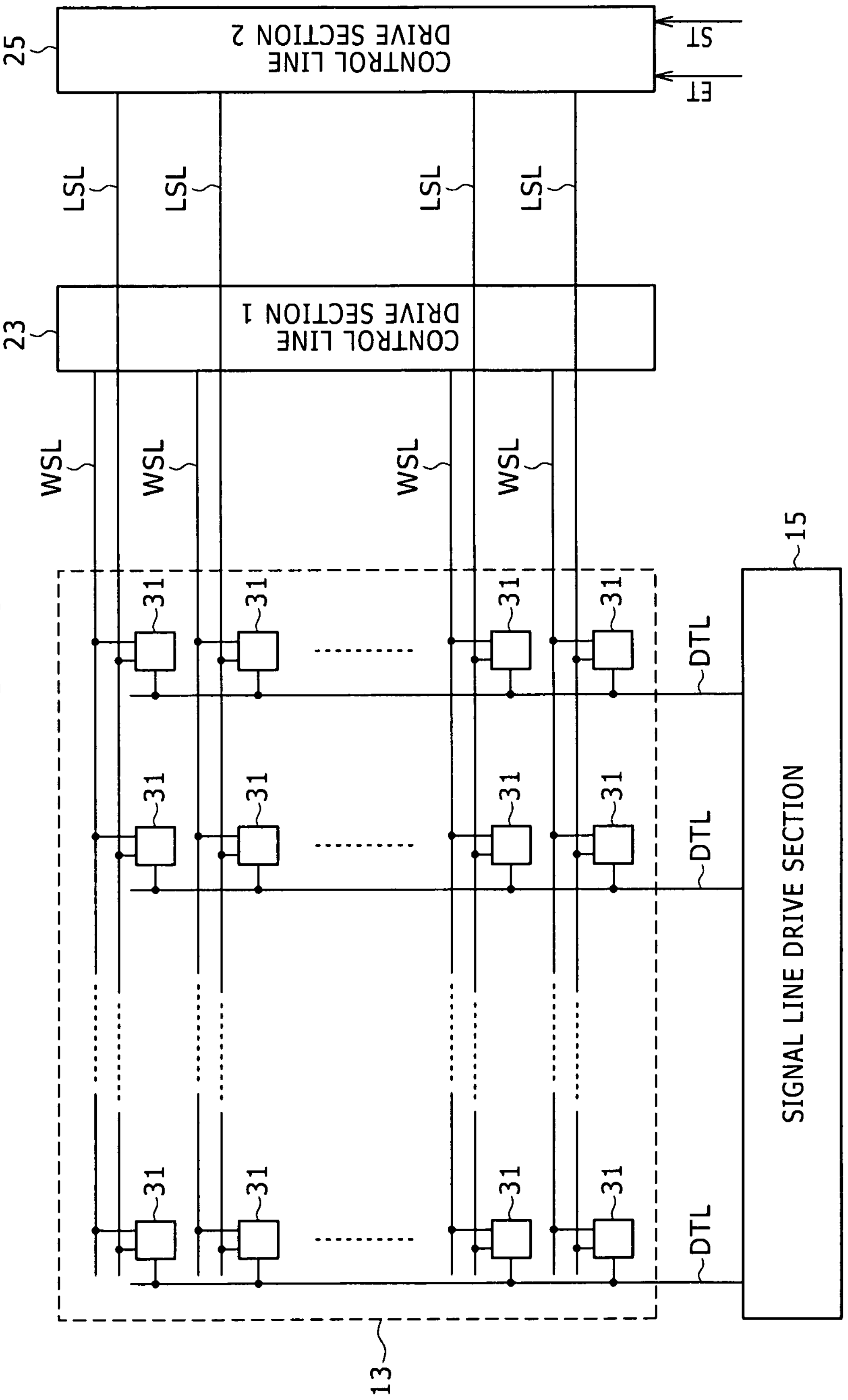
FIG. 5 is a diagram illustrating a configuration example of a pixel array section.

FIG. 4 illustrates a system configuration example of an organic EL panel 11. The organic EL panel 11 includes a pixel array section 13, signal line drive section 15 configured to drive signal lines, control line drive section 17 configured to drive control lines, signal processing section 19 and lighting condition setting section 21. These components are arranged on a glass substrate. In practical circuits, however, only some of the circuits shown in FIG. 4 may be arranged on the same substrate, with the remaining circuits arranged, for example, on a separate substrate.

(a) Pixel Array Section

The pixel array section 13 has a matrix of subpixels 31 arranged in M rows by N columns. A subpixel is the minimum unit of light emission region. Here, the subpixels 31 are, for example, associated with RGB pixels for the three primary colors making up a white unit.

Figure 6:
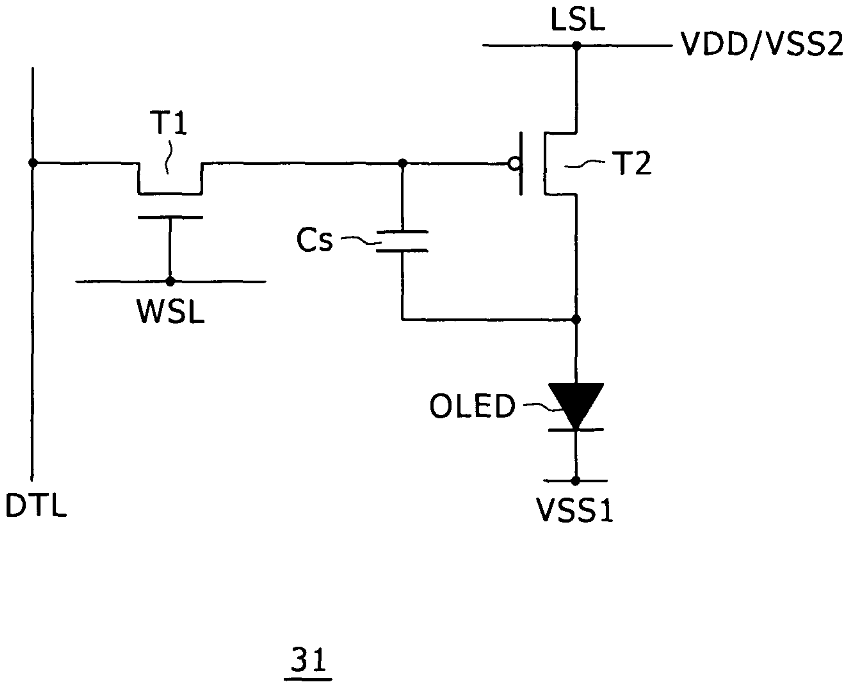
FIG. 6 is a diagram illustrating a configuration example of a pixel circuit.

FIG. 6 illustrates an example of pixel circuit of the subpixel 31 for active matrix driving. It should be noted that extremely wide ranging circuit configurations have been proposed for this type of pixel circuit. FIG. 6 shows one of the simplest of all configurations proposed.

In the case of FIG. 6, the pixel circuit includes a thin film transistor T1 configured to control the sampling (hereinafter referred to as a sampling transistor), thin film transistor T2 configured to control the supply of a drive current (hereinafter referred to as a drive transistor), holding capacitor Cs and organic EL element OLED.

In the case of FIG. 6, the sampling transistor T1 and drive transistor T2 include N-channel MOS (metal-oxide semiconductor) transistors. It should be noted that the operating condition of the sampling transistor T1 is controlled by a write control line WSL connected to its gate electrode. When the sampling transistor T1 is on, a signal potential Vsig associated with pixel data is written to the holding capacitor Cs via a signal line DTL. The holding capacitor Cs holds the written signal potential Vsig for one field period.

The holding capacitor Cs is a capacitive load connected between the gate and source electrodes of the drive transistor T2. The signal potential Vsig held by the holding capacitor Cs supplies a gate-to-source voltage Vgs of the drive transistor T2. A signal current Isig corresponding to this voltage is drawn from a lighting control line LSL serving as a current supply line and supplied to the organic EL element OLED.

It should be noted that the larger the signal current Isig, the larger the current flow through the organic EL element OLED and the higher the light emission luminance. That is, a gray level is expressed by the magnitude of the signal current Isig. So long as the supply of the signal current Isig continues, the organic EL element OLED continues to emit light at a given luminance.

Incidentally, the lighting control line LSL is driven by two different potentials. The supply and interruption of the signal current Isig are controlled by this binary drive.

More specifically, while the lighting control line LSL is controlled at a high potential VDD (that is, during a lighting period), the signal current Isig flows through the organic EL element OLED, causing the same element OLED to be lit.

On the other hand, while the lighting control line LSL is controlled at a low potential VSS2 (that is, during a non-lighting period), the supply of the signal current Isig is interrupted, causing the same element OLED to be unlit. As described above, the lighting period length per field period is controlled via the lighting control line LSL.

(b) Panel Drive Section

The signal line drive section 15 is a circuit device configured to apply the signal potential Vsig, correspond to the gray level information of each of the pixels, to the signal line DTL in accordance with horizontal and vertical synchronizing timings.

The control line drive section 17 is a circuit device configured to apply a control signal to the write control line WSL and lighting control line LSL in accordance with horizontal and vertical synchronizing timings.

In the case of the present embodiment, the signal line drive section 15 includes first and second control line drive sections 23 and 25. The first control line drive section 23 drives the write control line WSL. The second control line drive section 25 drives the lighting control line LSL.

The first control line drive section 23 is a circuit device configured to control the sampling transistor T1 to turn on at a write timing of the signal potential Vsig and at other timings.

Incidentally, the sampling transistor T1 turns on at other than the write timing of the signal potential Vsig. For example, the same transistor T1 turns on when the correction operation is performed in which the voltage equivalent to a threshold voltage Vth of the drive transistor T2 is written to the holding capacitor Cs.

The second control line drive section 25 is a circuit device configured to control the lighting control line LSL at the high potential VDD during the correction of the threshold voltage, during the writing of the signal potential Vsig and during a lighting period.

(c) Signal Processing Section

The signal processing section 19 is a circuit device configured to handle the signal format conversion, gamma conversion, synchronization and other processes to suit the form of display. It should be noted that a known circuit device is used as the signal processing section 19.

(d) Lighting Condition Setting Section

The lighting condition setting section 21 is a circuit device configured to detect the features of input image data and set the lighting conditions (number, arrangement and lengths of the lighting periods) to suit the display image based on the detection result.

Figure 7:
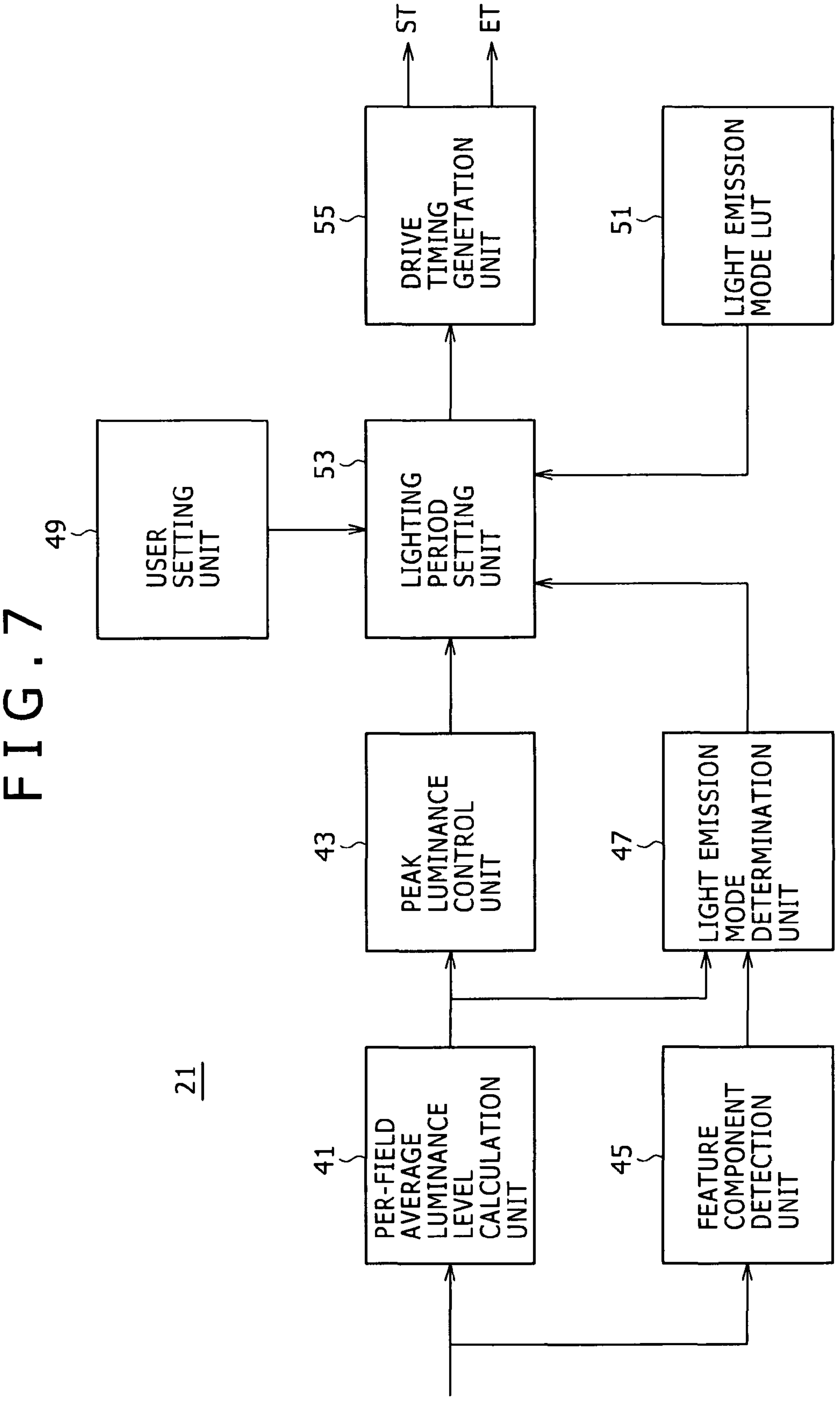
FIG. 7 is a diagram illustrating an example of internal configuration of a lighting condition setting section.

FIG. 7 illustrates an example of internal configuration of the lighting condition setting section 21. The lighting condition setting section 21 according to the present embodiment includes a per-field average luminance level calculation unit 41, peak luminance control unit 43, feature component detection unit 45, light emission mode determination unit 47, user setting unit 49, light emission mode LUT 51, lighting period setting unit 53 and drive timing generation unit 55.

(i) Per-Field Average Luminance Level Calculation Unit

The per-field average luminance level calculation unit 41 is a circuit device configured to calculate the average luminance level of input image data associated with all the pixels making up one field screen. Incidentally, input image data is supplied in the data format of R (red), G (green) and B (blue) pixel data.

Therefore, the per-field average luminance level calculation unit 41 converts each piece of the RGB pixel data associated with one of the pixels into a luminance level first in order to calculate the average luminance level. It should be noted that the average luminance level here may be output to the subsequent stage every field. Alternatively, the average luminance level may be output to the subsequent stage at intervals of a plurality of fields.

(ii) Peak Luminance Control Unit

The peak luminance control unit 43 is a circuit device configured to set the peak luminance level used to display the field screen of interest based on the calculated average luminance level. For example, the same unit 43 sets the peak luminance level to a high dynamic range value for a field screen with a low average luminance level. This type of screen corresponds to such a screen as that in which the night sky is dotted with stars. For this type of screen, the twinkling lights of the stars cannot be properly expressed if the peak luminance level is set to a low dynamic range value.

For a field screen with a high average luminance level, on the other hand, the peak luminance level is set to a medium dynamic range value.

It should be noted that, in the case of the present embodiment, the peak luminance level is set by referring only to the average luminance level. However, the peak luminance level may be set by referring to other information.

(iii) Feature Component Detection Unit

Figure 8:
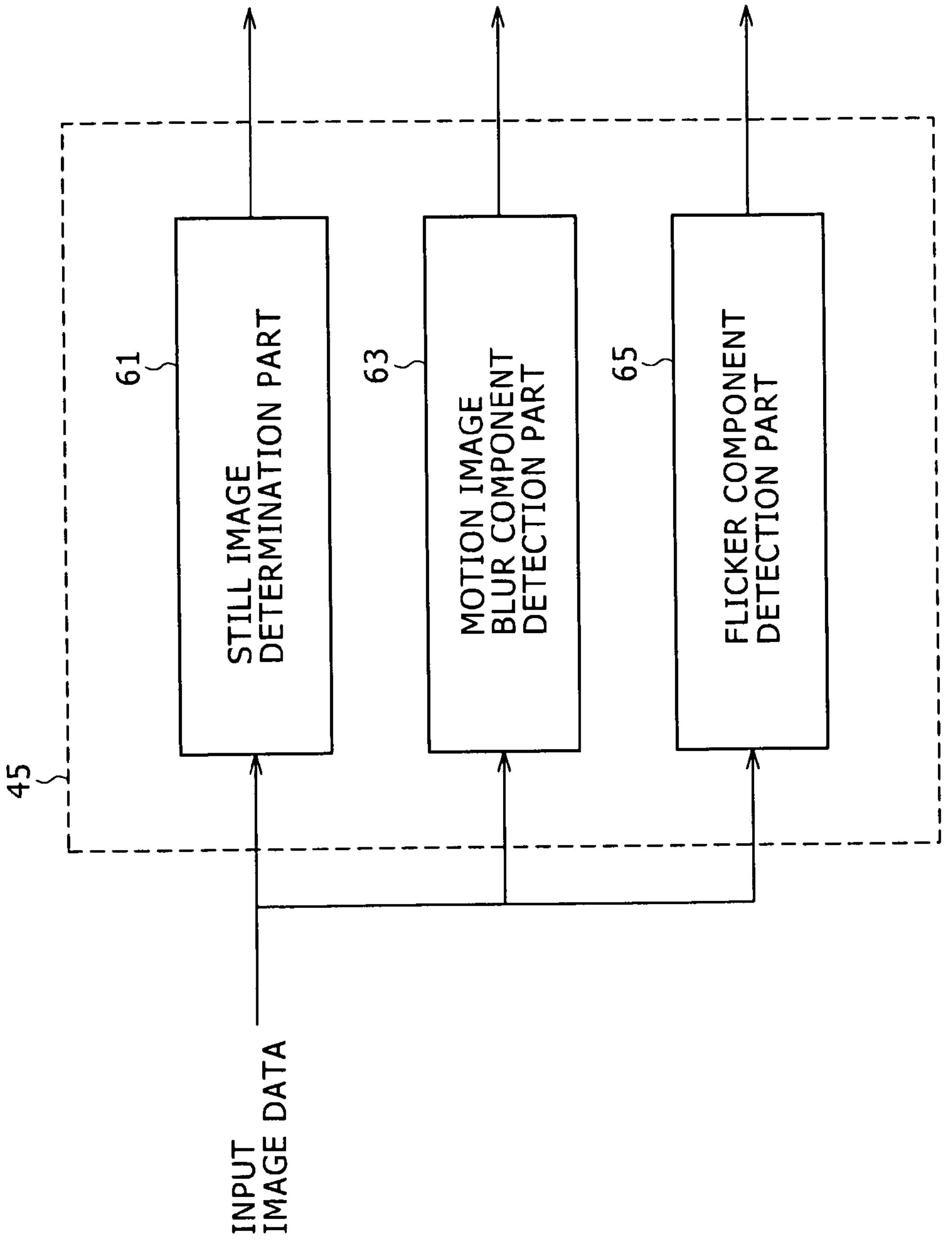
FIG. 8 is a diagram illustrating an example of internal configuration of a feature component detection unit.

The feature component detection unit 45 is a circuit device configured to detect the feature components of input image data. Here, the term "feature components" refer, for example, to the presence or absence of motion, motion image blur component level and flicker component level. FIG. 8 illustrates an example of internal configuration of the feature component detection unit 45. The same unit 45 illustrated in FIG. 8 includes a still image determination part 61, motion image blur component detection part 63 and flicker component detection part 65. Each of the parts will be described below.

Figure 9:
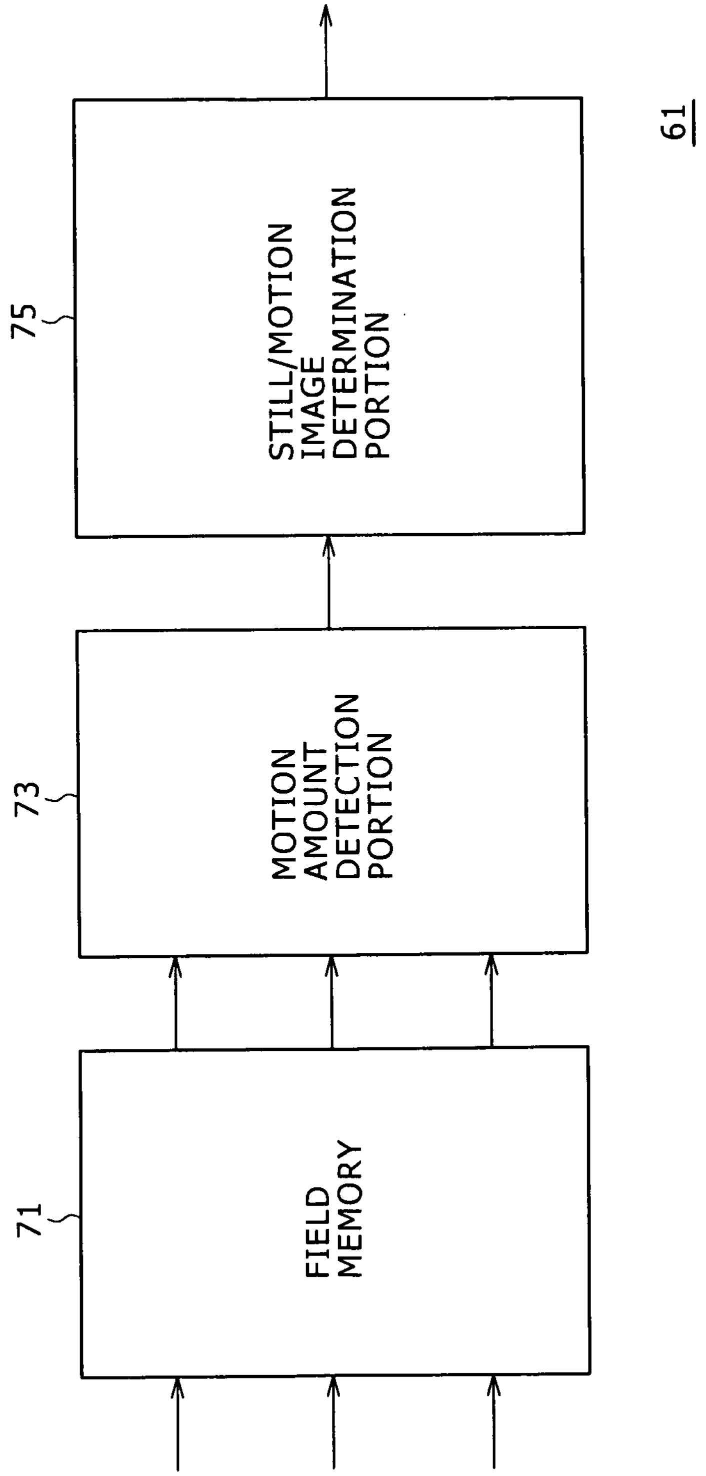
FIG. 9 is a diagram illustrating an example of internal configuration of a still image determination part.

The still image determination part 61 is a circuit device configured to determine the field screen as a motion image or still image based on the input image data. FIG. 9 illustrates a system example of the still image determination part 61. In the case of FIG. 9, the still image determination part 61 includes a field memory 71, motion amount detection portion 73 and still/motion image determination portion 75.

Of the above, the motion amount detection portion 73 is associated with a process function section configured to detect the motion amount based on the input image data. Recent years have seen the commercialization of motion detection systems using a comb filter and for frame interpolation and other systems as motion detection techniques. Basically, one of these existing motion detection systems is used as the motion amount detection portion 73.

However, a simple system may also be used which compares several to several hundreds of fields of the input image data to determine the field screen as a still image if the change in the data is extremely small.

It should be noted that, in the case of the present embodiment, the motion amount detection portion 73 need only be capable of detecting the motion amount and need not be capable of detecting the motion direction.

The still/motion image determination portion 75 is associated with a process function section configured to determine the image of interest as a still or motion image based on the detection result. Basically, the image with no motion amount is determined as a still image. However, the image with an extremely small motion amount is also determined as a still image. The determination threshold here is given as a design value which takes into account empirical information.

In the case of the present embodiment, all images other than those determined as still images are determined as motion images. However, other methods may also be used including that configured to include the magnitude of the motion amount in the determination result (method configured to represent the motion amount as large or small) and another configured to include whether the image has a telop or not in the determination result.

Figure 10:
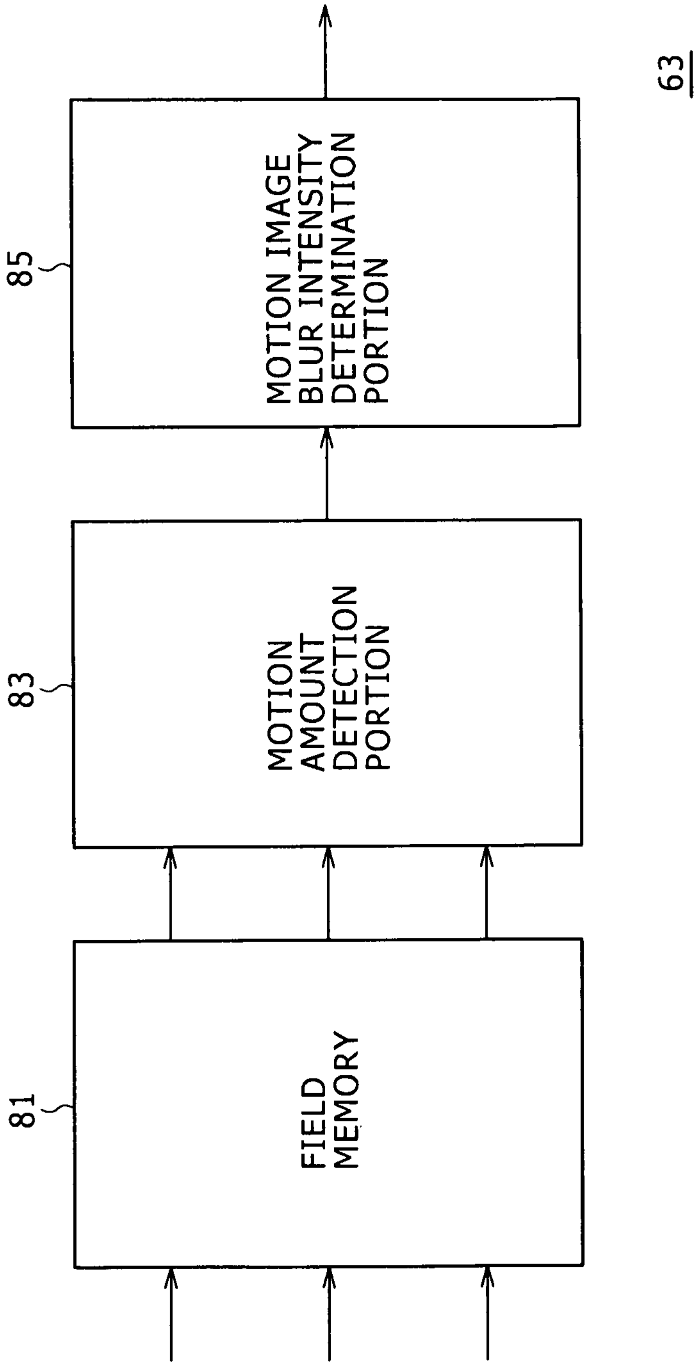
FIG. 10 is a diagram illustrating an example of internal configuration of a motion image blur component detection part.

The motion image blur component detection part 63 is a circuit device configured to determine the motion image blur component in the field screen. FIG. 10 illustrates a system example of the motion image blur component detection part 63. In the case of FIG. 10, the motion image blur component detection part 63 includes a field memory 81, motion amount detection portion 83 and motion image blur intensity determination portion 85.

Of the above, the field memory 81 and motion amount detection portion 83 are configured in the same manner as like portions of the still image determination part 61.

The motion image blur intensity determination portion 85 is associated with a process function section configured to determine the likelihood of occurrence (occurrence level) of motion image blur based on the detected motion amount.

Basically, the larger the motion amount, the higher the determination level. In the case of the present embodiment, the motion image blur intensity determination portion 85 has two different determination thresholds and outputs, based on the result of comparison with the thresholds, one of the three determination levels.

The flicker component detection part 65 is a circuit device configured to determine the flicker component in the field screen. Incidentally, flicker is readily perceived on the screen if the difference in luminance is equal to the given level or more and if the display area is perceived as a plane spreading over a given area or more.

To make this determination, the flicker component detection part 65 performs two different processes, one configured to detect whether the input image data generates a light emission luminance at which flicker is readily perceived, and another configured to determine whether the pixels having the luminance of interest spread over a region having a given area.

In the present embodiment, for example, where the maximum gray level is 100%, a gray level of 50% or more is used as a gray level at which flicker is readily perceived (determination threshold). Further, where the entire display region is 100%, a pixel region of 10% or more is used as the range in which flicker is readily perceived (determination threshold).

Figure 11:
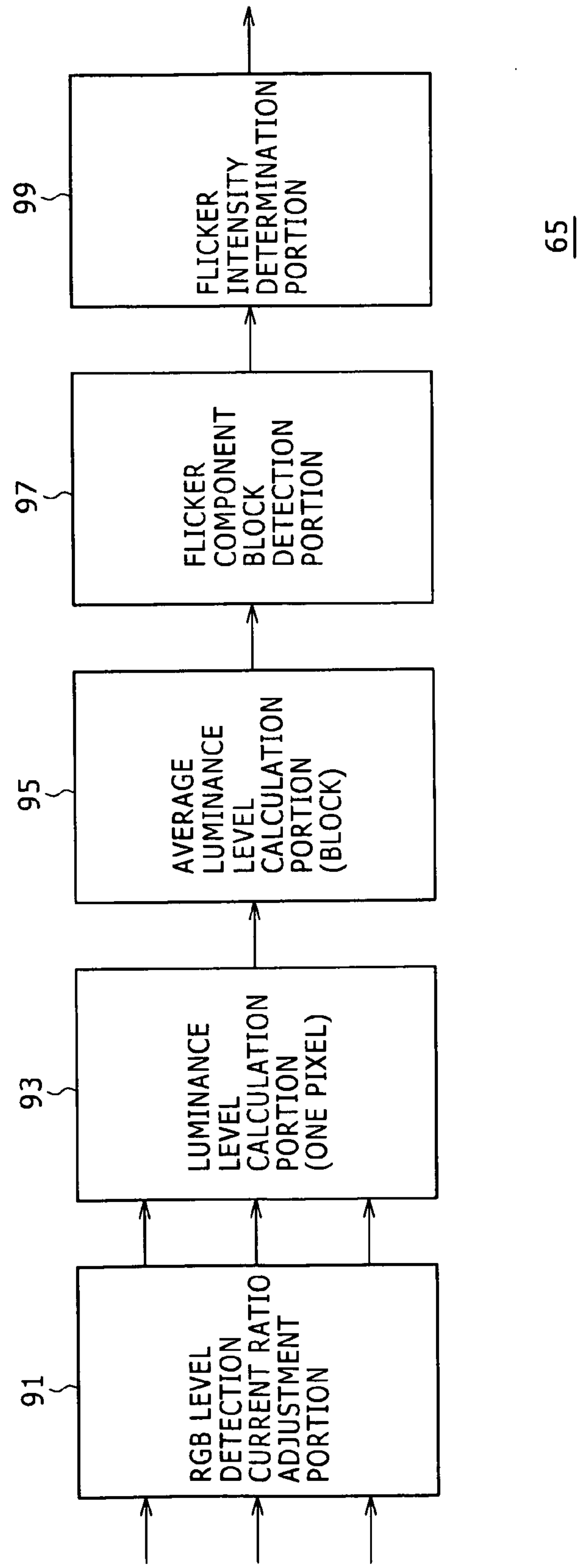
FIG. 11 is a diagram illustrating an example of internal configuration of a flicker component detection part.

FIG. 11 illustrates a system example of the flicker component detection part 65. In the case of FIG. 11, the flicker component detection part 65 includes an RGB level detection current ratio adjustment portion 91, luminance level calculation portion 93, average luminance level calculation portion 95, flicker component block detection portion 97 and flicker intensity determination portion 99.

Of the above, the RGB level detection current ratio adjustment portion 91 is a process function section configured to convert input image data associated with R, G or B pixel into a luminance level correspond to the associated visual sensitivity.

The luminance level calculation portion 93 is a process function section configured to calculate the luminance level on a pixel-by-pixel basis based on the luminance level calculated for each of the primary colors.

The average luminance level calculation portion 95 is a process function section configured to calculate the luminance level on a block-by-block basis based on the pixel-by-pixel luminance level. The blocks, which are the unit of calculation of average luminance level, are set so that the pixel count in each block is 10% or less of all the pixels across the display screen. FIG. 12 illustrates an example of setting blocks. In FIG. 12, one screen is divided, as an example, into 48 blocks (eight horizontal by six vertical).

The smaller the size of each block, the more accurate the determination. However, the more there are blocks, the more the amount of processing required for the determination.

The flicker component block detection portion 97 is a process function section configured to determine whether a plurality of blocks with an average luminance level (gray level) of 50% located adjacent to each other accounts for 10% or more of the entire screen. The same portion 97 also detects the size of the region occupied by and the number of such blocks.

The flicker intensity determination portion 99 is associated with a process function section configured to determine the likelihood of occurrence (occurrence level) of flicker based on the detection result.

Basically, the larger the area of the region satisfying the conditions for ready perception of flicker, or the more there are regions appearing per screen which satisfy the conditions for ready perception of flicker, the more likely flicker occurs.

In the case of the present embodiment, the flicker intensity determination portion 99 has two different determination thresholds and outputs, based on the result of comparison with the thresholds, one of the three determination levels.

(iv) Light Emission Mode Determination Unit

The light emission mode determination unit 47 is a circuit device configured to determine the light emission mode used to display the screen of interest based on the detected feature components (motion determination result, motion image blur level and flicker level).

Figure 13:
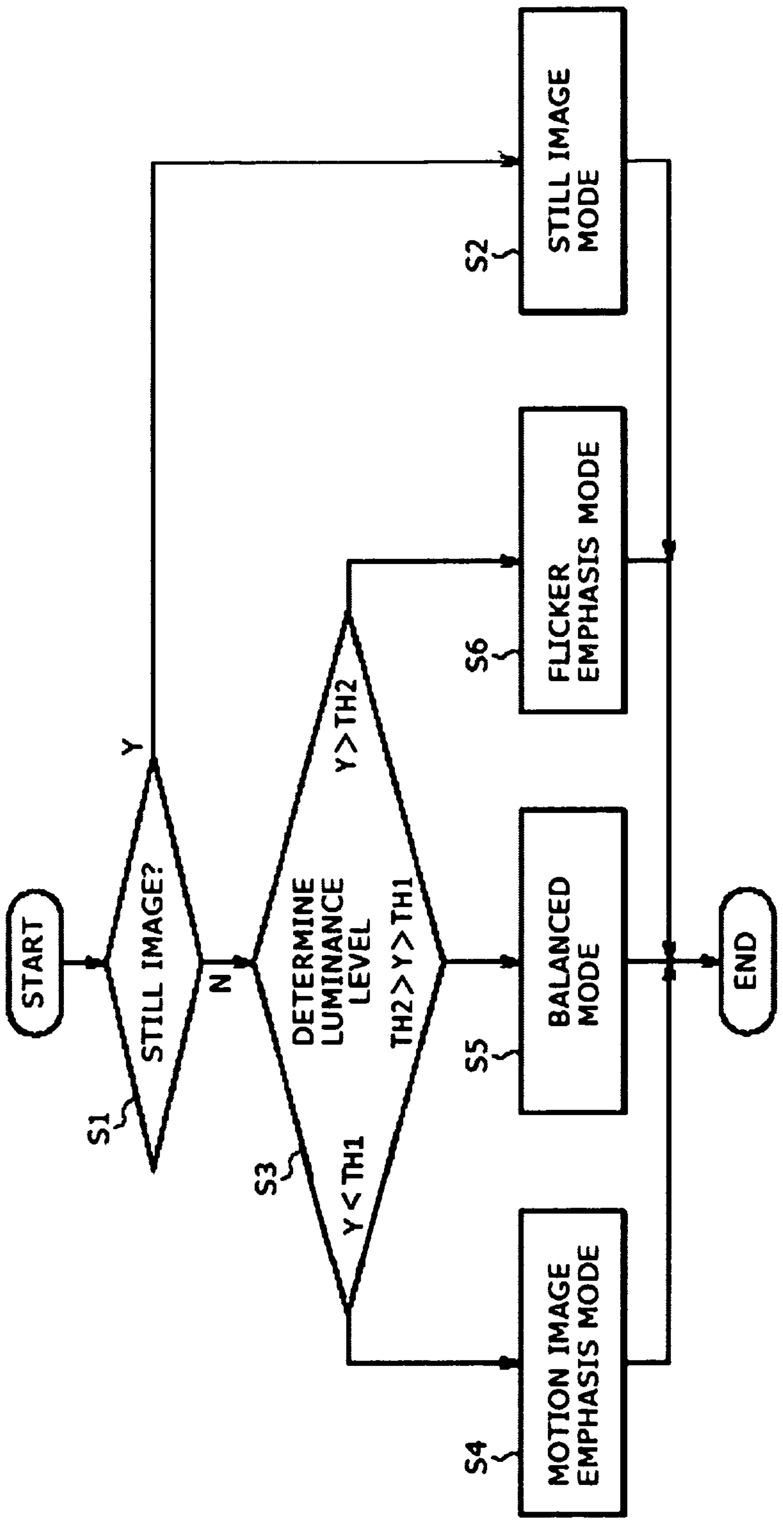
FIG. 13 is a diagram illustrating an example of determination operation performed by a light emission mode determination section.

FIG. 13 illustrates an example of determination performed by the light emission mode determination unit 47 used in the present embodiment.

First, the light emission mode determination unit 47 determines whether the image of interest is a still image (step S1). If the determination is affirmative (still image), the same unit 47 sets the still image mode as the light emission mode for the image of interest (step S2).

On the other hand, if the determination is negative (motion image) in step S1, the light emission mode determination unit 47 determines the light emission mode based on the magnitude of the average luminance level of the image of interest (field) (step S3).

If the average luminance level is lower than the first threshold, the light emission mode determination unit 47 sets the motion image emphasis mode as the light emission mode for the image of interest (step S4).

If the average luminance level is higher than the first threshold but lower than the second threshold, the light emission mode determination unit 47 sets the balanced mode as the light emission mode for the image of interest (step S5).

If the average luminance level is higher than the second threshold, the light emission mode determination unit 47 sets the flicker emphasis mode as the light emission mode for the image of interest (step S6).

Incidentally, the term "motion image emphasis mode" refers to a light emission mode in which a lighting period, shorter in length than a specific lighting period, is provided close to the specific lighting period so as to suppress motion image blur.

Further, the term "flicker emphasis mode" refers to a mode in which a plurality of lighting periods are provided in a distributed manner over the entire duration of one field period.

Still further, the term "balanced mode" refers to a mode in which lighting periods are provided in a manner intermediate between the motion image emphasis mode and flicker emphasis mode.

It should be noted that, in the case of the present embodiment, one of the three levels of each of the motion image emphasis mode and flicker emphasis mode is set according to the detected levels of motion image blur and flicker.

(v) User Setting Unit

The user setting unit 49 is a circuit device provided to reflect user preferences in the setting of lighting periods. That is, this circuit device is designed to store, in a storage area, user preferences about the display quality accepted via the operation screen.

Among user preferences about the display quality are not only such information as emphasis on the display quality of motion and still images but also such information as emphasis on either motion image blur or flicker.

(vi) Light Emission Mode LUT

The light emission mode LUT 51 is a storage area configured to hold, in tabular form, the relationship between the number, arrangement and lengths of lighting periods suitable for each light emission mode. In the case of the present embodiment, the light emission mode LUT 51 stores, for example, a table which associates the arrangement (timings) of lighting and non-lighting periods with the combination patterns of peak luminance level and light emission mode.

However, the light emission mode LUT 51 may store a calculation formula to find the arrangement of lighting periods suited to a combination pattern of peak luminance level and light emission mode.

(vii) Lighting Period Setting Unit

The lighting period setting unit 53 is a circuit device configured to set the number, arrangement and lengths of lighting periods per field period in a specific manner according to the setting conditions defined for the determined light emission mode so as to provide the peak luminance level which is set according to the input image data.

For this setting, the user setting information and light emission mode LUT are also referred to.

Figure 14:
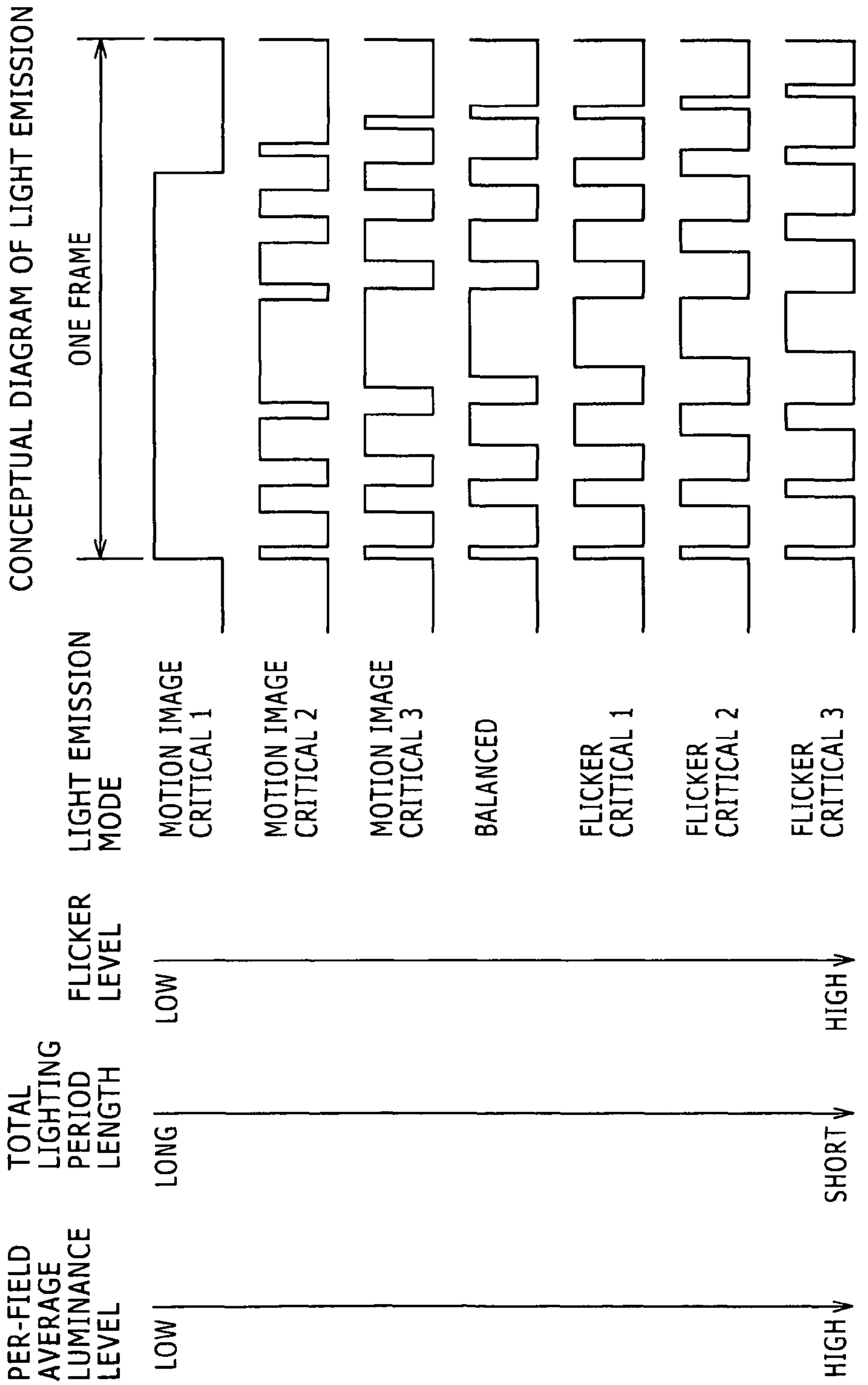
FIG. 14 is a diagram illustrating a conceptual example of how lighting periods are set by a lighting period setting unit.

FIG. 14 illustrates a conceptual diagram of how lighting periods are set by the lighting period setting unit 53. It should be noted that FIG. 14 shows the relationship between the light emission modes and conceptual light emission diagram and that between the conceptual light emission diagram and each of the feature components.

In FIG. 14, motion image emphasis 1 denotes the light emission mode suited to the display of the image with the largest motion. Motion image emphasis 2 denotes the light emission mode suited to the display of the image with the second largest motion. Motion image emphasis 3 denotes the light emission mode suited to the display of the image with the third largest motion.

As illustrated in FIG. 14, the arrangement of lighting periods is set so that the lighting periods spread out over a wider time span in the following order: motion image emphasis 1, 2 and 3.

On the other hand, the flicker emphasis modes denote the relationship opposite to that of the motion image emphasis modes. For example, flicker emphasis 1 denotes the light emission mode suited to the display of the image with the least flicker of all the images in which flicker is readily visible.

Flicker emphasis 2 denotes the light emission mode suited to the display of the image with the second least flicker of all the images in which flicker is readily visible.

Flicker emphasis 3 denotes the light emission mode suited to the display of the image with the most flicker of all the images in which flicker is readily visible.

As illustrated in FIG. 14, the arrangement of lighting periods is set so that the lighting periods spread out over a wider time span in the following order: flicker emphasis 1, 2 and 3.

It should be noted that the balanced mode is an intermediate mode between motion image emphasis 3 and flicker emphasis 1.

FIG. 14 illustrates a case in which seven lighting periods are provided per field period. In any light emission mode, the fourth lighting period is the longest of all periods. The length of each of the lighting periods is set so that the lighting periods gradually diminish in length in a symmetrical manner relative to the fourth lighting period.

Incidentally, the fourth lighting period is set to be longest in motion image emphasis 1. This period gradually diminishes in length in the following order: motion image emphasis 2, motion image emphasis 3, balanced, flicker emphasis 1, flicker emphasis 2 and flicker emphasis 3.

The relationship between the number, arrangement and lengths of lighting periods is output to the drive timing generation unit 55.

It should be noted that the total lighting period length is set according to the peak luminance level supplied from the peak luminance control unit 43.

For this reason, the number, arrangement and lengths of lighting periods are set so that the total lighting period length is satisfied. Therefore, if a plurality of lighting periods are provided per field period, the total lighting period length matches the sum of all lighting periods.

(viii) Drive Timing Generation Unit

The drive timing generation unit 55 is a circuit device configured to generate drive pulses (lighting period start pulse ST and end pulse ET) according to the set number, arrangement and lengths of lighting periods. It should be noted that the drive pulses generated by the drive timing generation unit 55 are output to the second control line drive section 25 configured to drive the lighting control line LSL.

(B-2) Examples of Light Emission Status Control

A description will be given below of examples of light emission status control using the lighting condition setting section 21.

However, we assume that the supplied frame rate of the display image is between 24 Hz and 60 Hz.

It should be noted that the length of each of the lighting periods is set in all light emission modes other than the still image mode and motion image emphasis mode 1 so that the center of light emission is at the center of the variable range of lighting period lengths.

It should also be noted that, in all light emission modes other than the still image mode and motion image emphasis mode 1, the length of each of the lighting periods is set according to the externally supplied total lighting period length so that the preset ratio is satisfied.

In each of the setting examples given below (excluding still image mode and motion image emphasis mode 1), therefore, the closer any of the N lighting periods is to the center of the arrangement, the larger the ratio. That is, the closer the lighting period is to the center of the arrangement, the longer it is. The closer the lighting period is to the edge of the arrangement, the shorter it is. This makes it more likely that the light regions within a field period are perceived by the user as a single block.

Further, in each of the setting examples given below (excluding still image mode and motion image emphasis mode 1), the relationship in length between the lighting periods always satisfies a given ratio.

This ensures that the light regions appear in the same manner irrespective of the total lighting period length, thus avoiding the user from having a feeling of wrongness.

Still further, in all light emission modes other than the still image mode and motion image emphasis mode 1, the start timing of the lighting period appearing first in the field period and the end timing of that appearing last in the same period are set in a fixed manner according to the maximum total lighting period length.

More specifically, where the entire field period is expressed as 100%, the start timing of the lighting period appearing first is fixed to 0%, and the end timing of that appearing last to the maximum total lighting period length.

Specific examples will be described one by one below. It should be noted that the ratio in length between the lighting periods is set in advance. However, this ratio should preferably be changeable by external control. It should also be noted that the maximum variable range of lighting period lengths is set in advance for each of the light emission modes.

(a) When Light Emission Mode is Determined as Still Image Mode

Figures 15A, 15B, 15C:
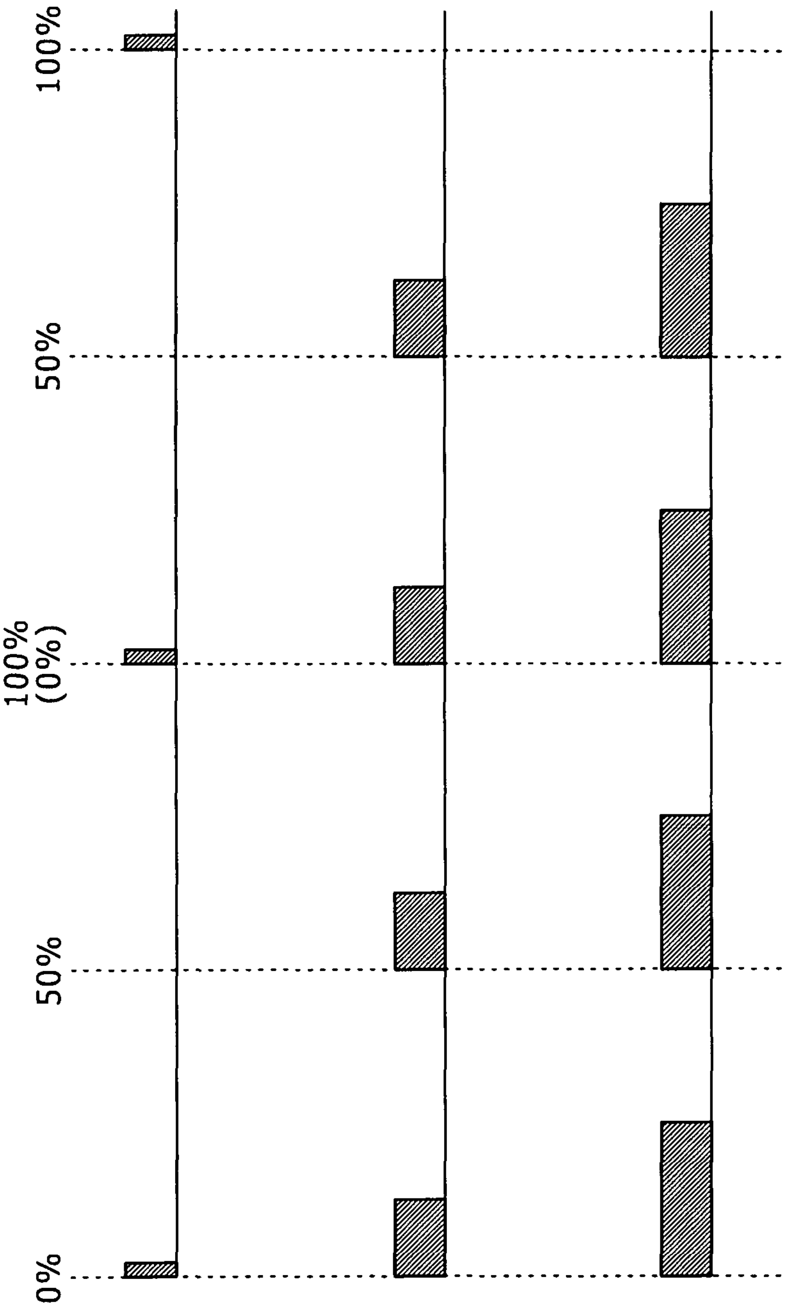
FIGS. 15A to 15C are diagrams illustrating examples of drive timings for still image mode.

FIGS. 15A to 15C illustrate examples of arrangement of lighting periods when the light emission mode is determined as the still image mode. FIGS. 15A to 15C illustrate cases in which two lighting periods are provided per field period.

FIG. 15A illustrates an example in which the total lighting period length is extremely short. FIG. 15B illustrates an example in which the total lighting period length is 25%. FIG. 15C illustrates an example in which the total lighting period length is 50%.

As illustrated in FIGS. 15A to 15C, the start timing of the first lighting period is fixed to 0% of one field period, and that of the second lighting period to 50% thereof.

Further, the ratio in length between the first and second lighting periods is 1 to 1 (that is, two are equal in length). It should be noted that if the image has much motion although determined as a still image, the number of lighting periods should preferably be increased. On the other hand, if the image has a little motion, the number of lighting periods should preferably be reduced.

Incidentally, in the case of FIGS. 15A to 15C, if the total lighting period length is given as A % of one field period, the lighting and non-lighting period lengths are given by the formulas shown below.

In the following formulas, the length of each of the first and second lighting periods is T1, and the length of each of the two non-lighting periods T2:

$$T1 = A\,\%/2$$

$$T2 = (100 - A\,\%)/2$$

(b) When Light Emission Mode is Determined as Motion Image Emphasis Mode 1

FIGS. 16A to 16D illustrate examples of arrangement of lighting periods when the light emission mode is determined as the motion image emphasis mode 1. FIGS. 16A to 16D illustrate cases in which one lighting period is provided per field period. It should be noted that FIGS. 16A to 16D show cases in which the maximum total lighting period length is set to 75% of one field period. Therefore, the lighting periods are varied in length in the range from 0% to 75% of one field period. Further, a non-lighting period is always provided in the range between the 75% and 100% marks of one field period.

Figures 16A, 16B, 16C, 16D:
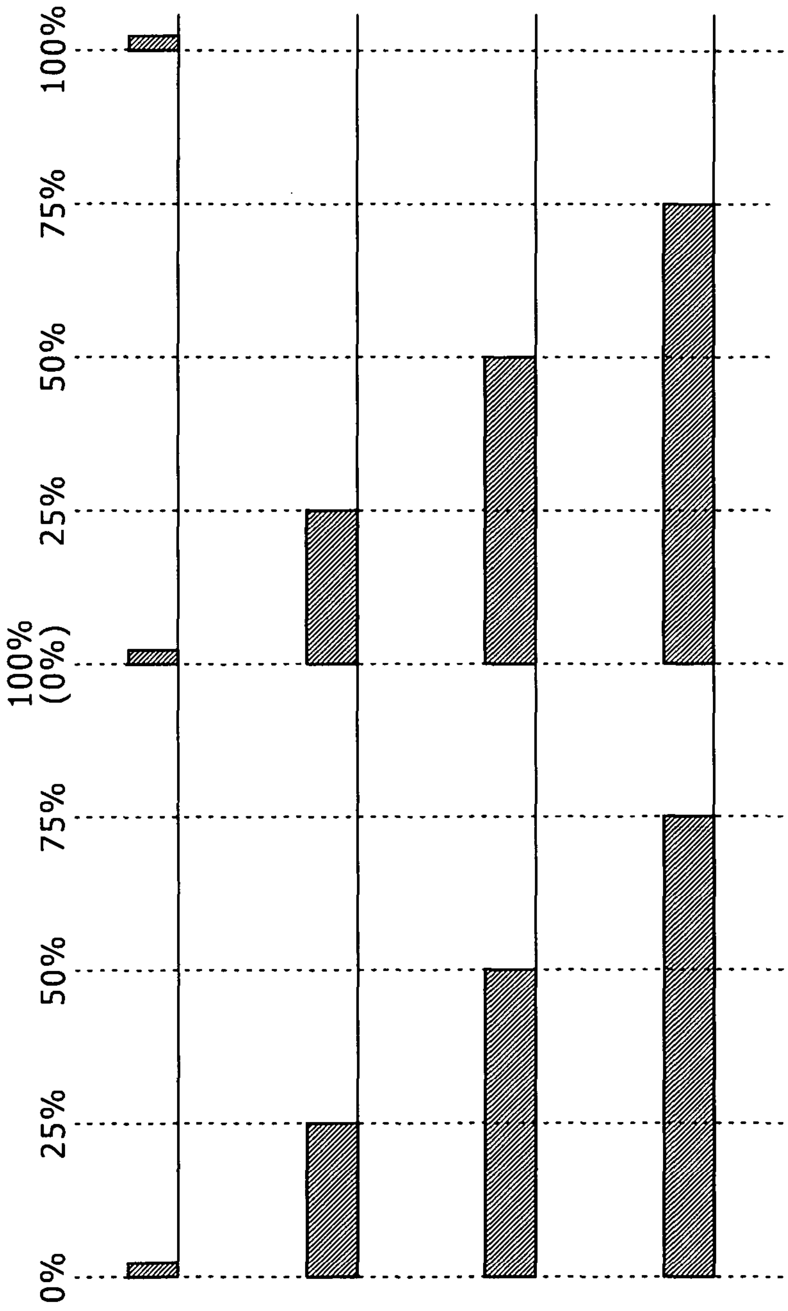
FIGS. 16A to 16D are diagrams illustrating examples of drive timings for motion image emphasis mode.
Figures 17A, 17B, 17C, 17D:
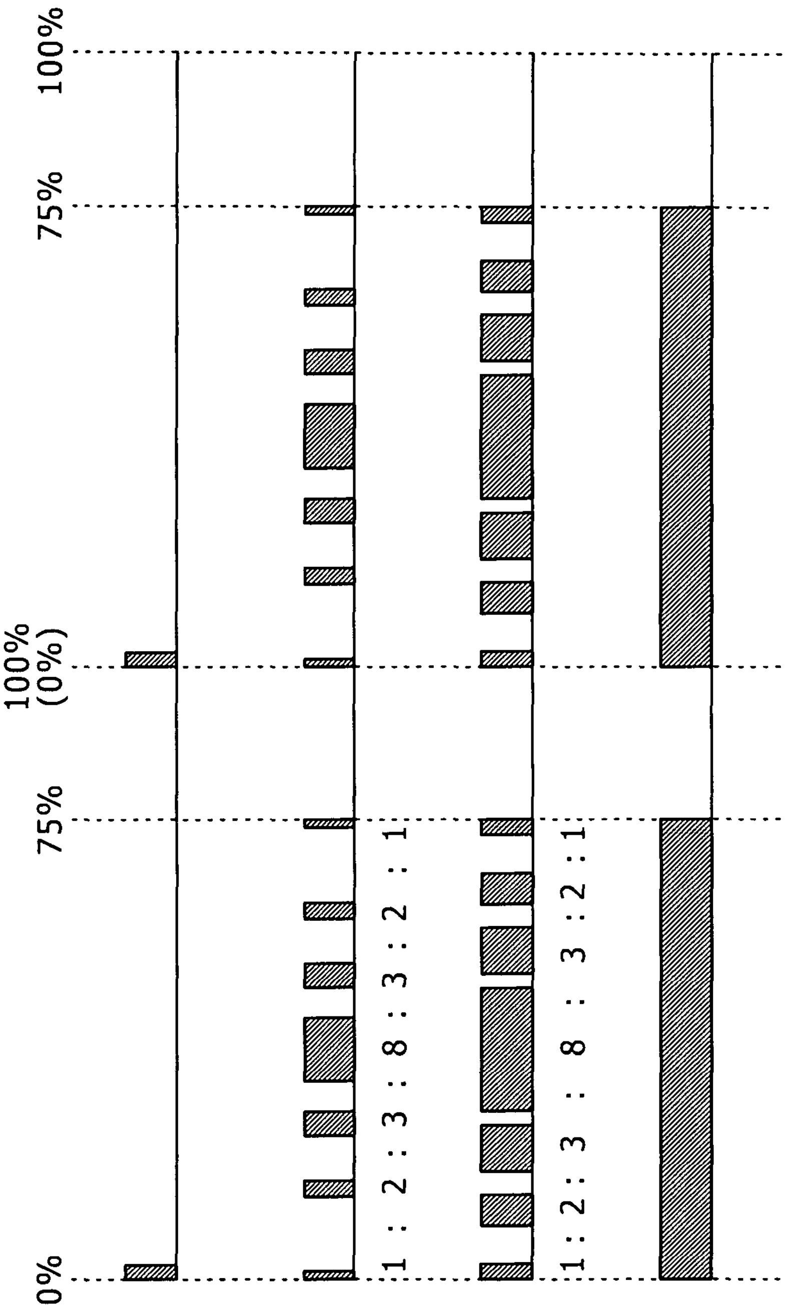
FIGS. 17A to 17D are diagrams illustrating other examples of drive timings for motion image emphasis mode.
Figures 18A, 18B, 18C, 18D:
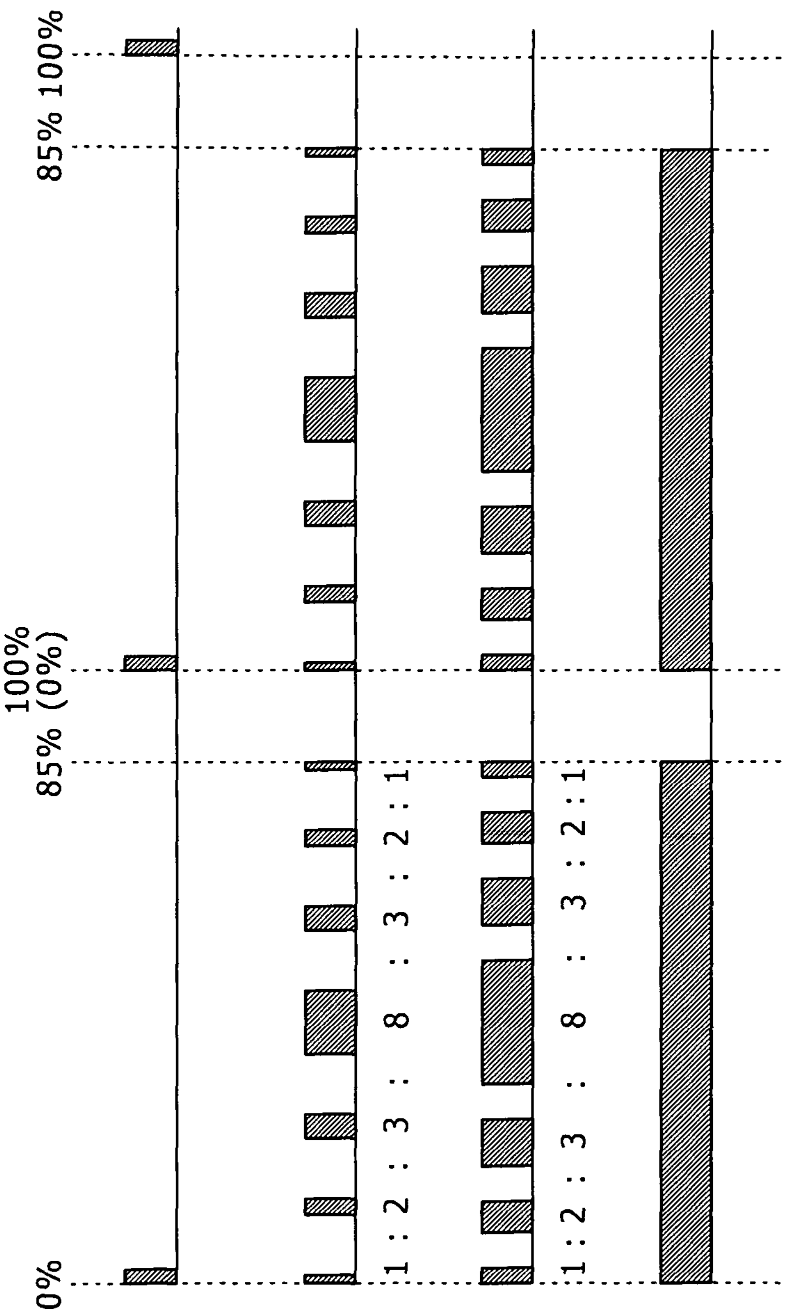
FIGS. 18A to 18D are diagrams illustrating examples of drive timings for balanced mode.
Figures 19A, 19B, 19C, 19D:
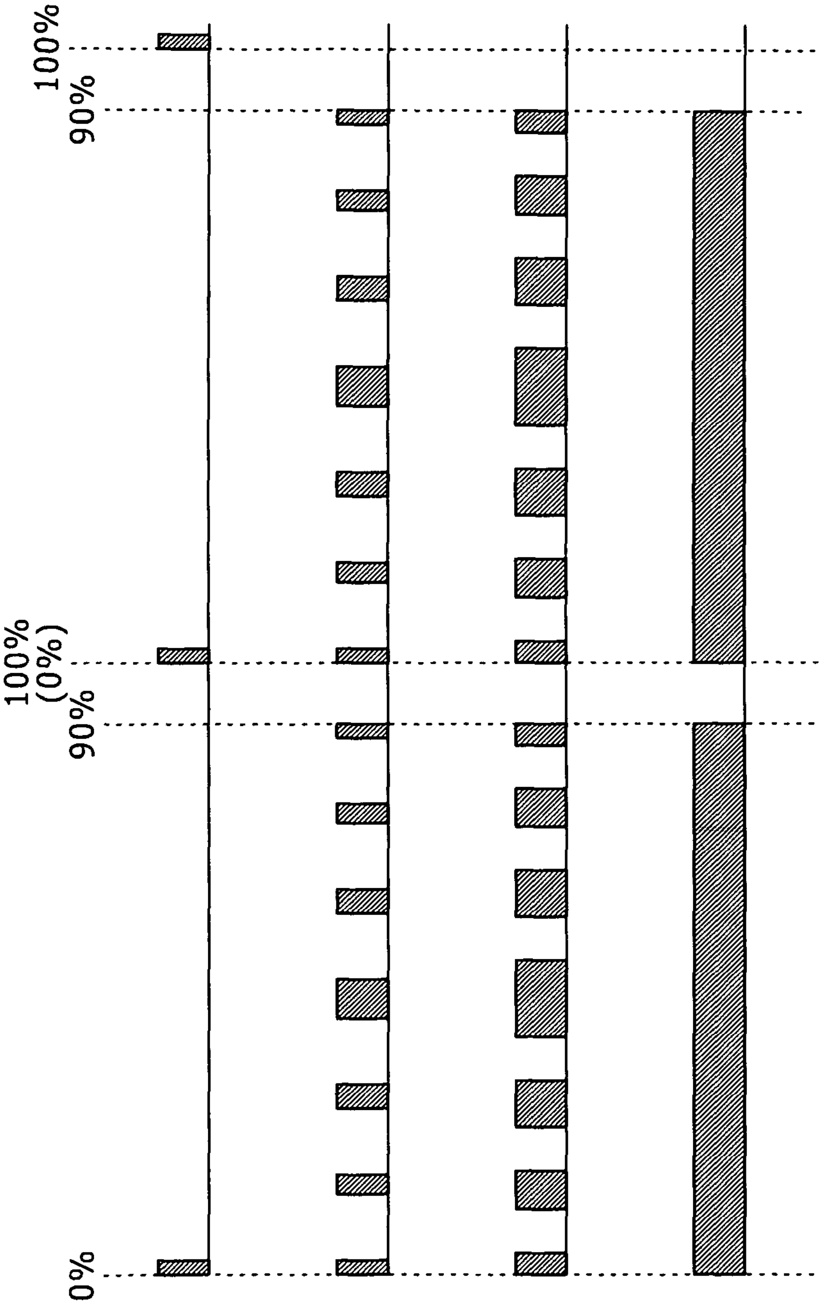
FIGS. 19A to 19D are diagrams illustrating examples of drive timings for flicker emphasis mode.
Figures 20A, 20B, 20C, 20D:
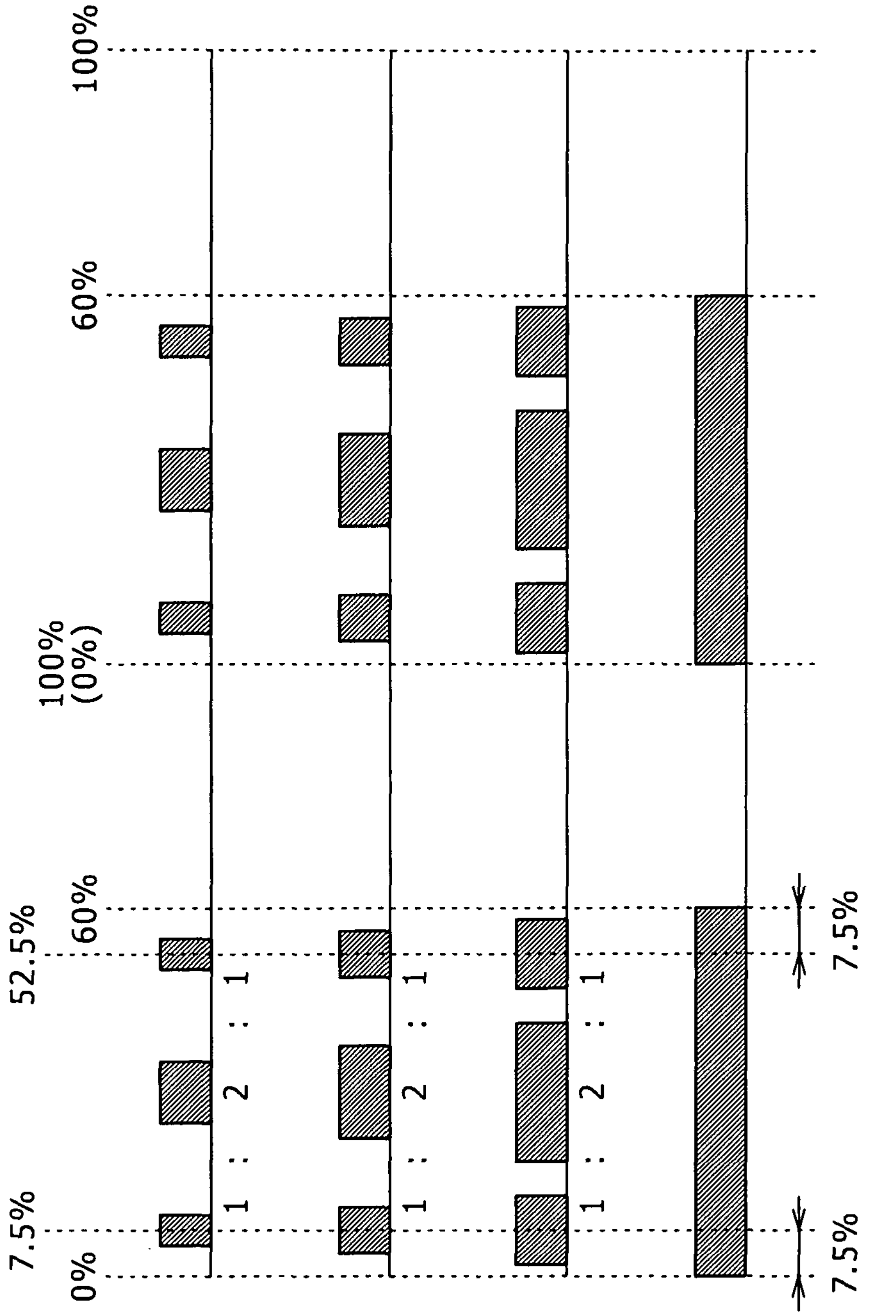
FIGS. 20A to 20D are diagrams illustrating other examples of drive timings.
Figures 21A, 21B, 21C, 21D:
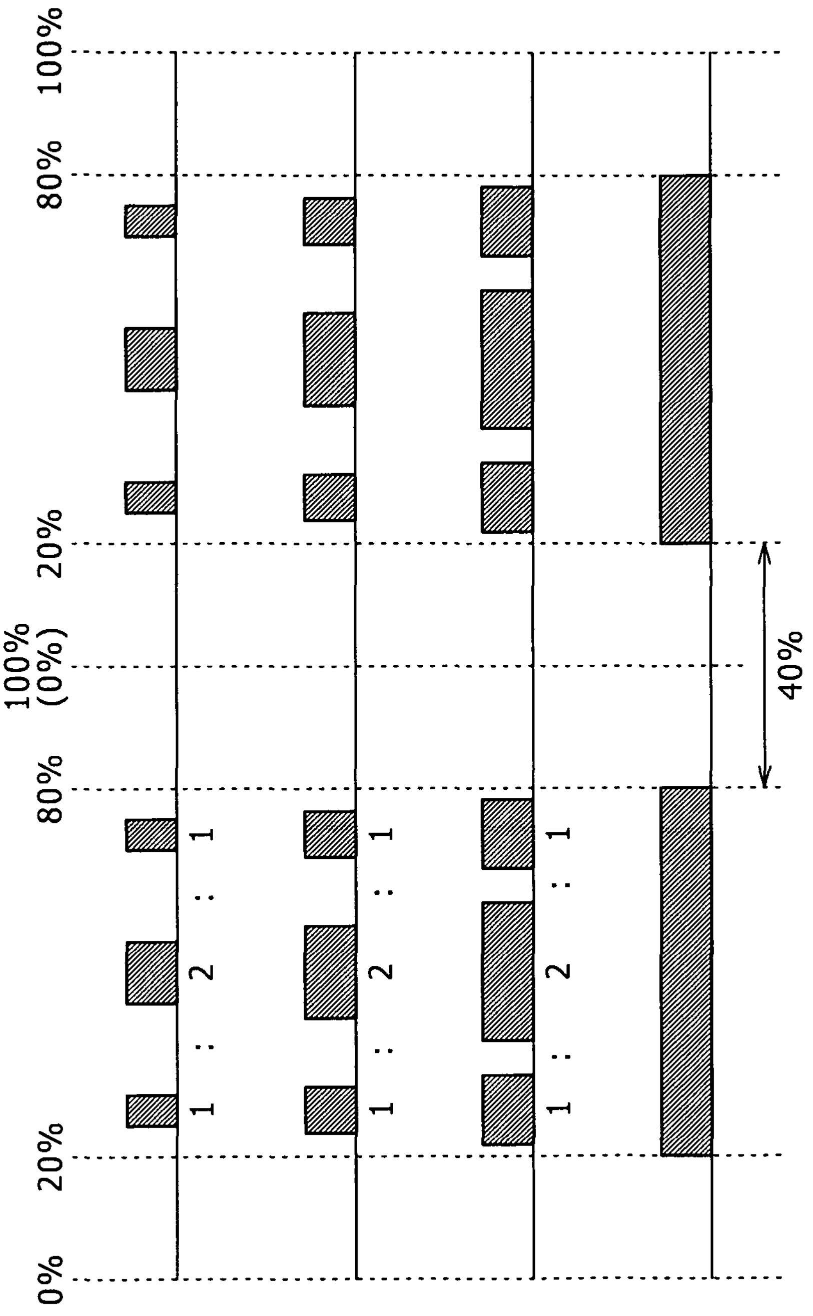
FIGS. 21A to 21D are diagrams illustrating still other examples of drive timings.

FIG. 16A illustrates an example in which the total lighting period length is extremely short. FIG. 16B illustrates an example in which the total lighting period length is 25%. FIG. 16C illustrates an example in which the total lighting period length is 50%. FIG. 16D illustrates an example in which the total lighting period length is 75%.

As illustrated in FIGS. 16A to 16D, the start timing of a lighting period is fixed to 0% of one field period.

In the case of FIGS. 16A to 16D, if the total lighting period length is given as A % of one field period, the lighting and non-lighting period lengths are given by the formulas shown below.

In the following formulas, the length of the lighting period is T1, and the length of the non-lighting period T2:

$$T1 = A\,\%$$

$$T2 = 100 - A\,\%$$

(c) When Light Emission Mode is Determined as Motion Image Emphasis Mode 2 or 3

FIGS. 17A to 17D illustrate examples of arrangement of lighting periods when the light emission mode is determined as the motion image emphasis mode 2 or 3. FIGS. 17A to 17D illustrate cases in which seven lighting periods are provided per field period. It should be noted that, in the case of FIGS. 17A to 17D, the lengths of the lighting periods are set at a 1:2:3:8:3:2:1 ratio in order of appearance, from earliest to latest.

FIGS. 17A to 17D illustrate the arrangement of lighting periods in this case and the change in each lighting period length with change in total lighting period length.

FIGS. 17A to 17D show cases in which the maximum total lighting period length is set to 75% of one field period. Therefore, the lighting periods are varied in length in the range from 0% to 75% of one field period. Further, a non-lighting period is always provided in the range between the 75% and 100% marks of one field period.

It should be noted that if the total lighting period length is extremely short (FIG. 17A), only one lighting period is provided, and the length of this lighting period is varied.

Incidentally, if the total lighting period length is greater than the set length, seven lighting periods are provided per field period.

In this case, the start timing of the first lighting period is fixed to 0% of one field period, and the end timing of the seventh lighting period to 75% thereof.

It should be noted that, also in the case of this setting example, the lengths of the non-lighting periods provided between the lighting periods are set at a ratio reverse to that of the lighting periods so that the closer the non-lighting period is to the center, the shorter it is.

In this case, if the total lighting period length increases, the lengths of the lighting periods change in a symmetrical manner relative to the 37.5% mark of one field period which is the center of the variable range and which coincides with the center of the fourth lighting period.

Naturally, the lighting periods change in length while maintaining their 1:2:3:8:3:2:1 ratio. Then, when the total lighting period length reaches its maximum (FIG. 17D), all the lighting periods combine into a single period.

At this time, if the total lighting period length is given as A % of one field period, the lighting and non-lighting period lengths are given by the formulas shown below.

In the following formulas, the length of each of the first and seventh lighting periods is T1, the length of each of the second and sixth lighting periods T2, the length of each of the third and fifth lighting periods T3, and the length of the fourth lighting period T4.

Further, the length of each of the first and sixth non-lighting periods is T5, the length of each of the second and fifth non-lighting periods is T6, and the length of each of the third and fourth non-lighting periods is T7.

$$T1=A\%/20$$

$$T2=(A\%/20)*2$$

$$T3=(A\%/20)*3$$

$$T4=(A\%/20)*8$$

$$T5=(75\%-A\%)/12$$

$$T6=((75\%-A\%)/12)*2$$

$$T7=((75\%-A\%)/12)*3$$

It should be noted that the display performance can be adjusted by changing the lengths of the non-lighting periods even with the lengths of the lighting periods left unchanged. For example, if the spacing (non-lighting period) between the first and second lighting periods and that between the seventh and sixth lighting periods can be increased in an equidistant manner and if the spacing (non-lighting period) between the third and fourth lighting periods and that between the fifth and fourth lighting periods can be reduced in an equidistant manner, the flicker visibility can be reduced in exchange for a slight reduction in motion image display performance.

In this case, the non-lighting period lengths can be given, for example, by the formulas shown below.

$$T5=((75\%-A\%)/6)*1.25$$

$$T6=(75\%-A\%)/6$$

$$T7=((75\%-A\%)/6)*0.75$$

(d) When Light Emission Mode is Determined as Balanced Mode

FIGS. 18A to 18D illustrate examples of arrangement of lighting periods when the light emission mode is determined as the balanced mode. FIGS. 18A to 18D also illustrate cases in which seven lighting periods are provided per field period. It should be noted that, in the case of FIGS. 18A to 18D, the lengths of the lighting periods are set at a 1:2:3:8:3:2:1 ratio in order of appearance, from earliest to latest.

It should be noted, however, that in the case of FIGS. 18A to 18D, the maximum total lighting period length is set to 85% of one field period, which is wider than in the motion image emphasis modes. The reason for this is that the screen contains more flicker component.

In the case of this example, a non-lighting period is always provided in the range between the 85% and 100% marks of one field period.

It should be noted that if the total lighting period length is extremely short (FIG. 18A), only one lighting period is provided, and the length of this lighting period is varied.

Incidentally, if the total lighting period length is greater than the set length, seven lighting periods are provided per field period.

In this case, the start timing of the first lighting period is fixed to 0% of one field period, and the end timing of the seventh lighting period to 85% thereof.

It should be noted that, in the case of this setting example, the lengths of the non-lighting periods provided between the lighting periods are all set at the same ratio.

In this case, if the total lighting period length increases, the lengths of the lighting periods change in a symmetrical manner relative to the 42.5% mark of one field period which is the center of the variable range and which coincides with the center of the fourth lighting period.

Naturally, the lighting periods change in length while maintaining their 1:2:3:8:3:2:1 ratio. Then, when the total lighting period length reaches its maximum (FIG. 18D), all the lighting periods combine into a single period.

At this time, if the total lighting period length is given as A % of one field period, the lighting and non-lighting period lengths are given by the formulas shown below.

In the following formulas, the length of each of the first and seventh lighting periods is T1, the length of each of the second and sixth lighting periods T2, the length of each of the third and fifth lighting periods T3, and the length of the fourth lighting period T4. Further, the length of each of the non-lighting periods is T5.

$$T1=A\%/20$$

$$T2=(A\%/20)*2$$

$$T3=(A\%/20)*3$$

$$T4=(A\%/20)*8$$

$$T5=(85\%-A\%)/6$$

(e) When Light Emission Mode is Determined as Flicker Emphasis Mode

FIGS. 19A to 19D illustrate examples of arrangement of lighting periods when the light emission mode is determined as the flicker emphasis mode. FIGS. 19A to 19D also illustrate cases in which seven lighting periods are provided per field period. It should be noted that, in the case of FIGS. 19A to 19D, the lengths of the lighting periods are set at a 1:1.25:1.5:2.5:1.5:1.25:1 ratio in order of appearance, from earliest to latest.

It should be noted, however, that in the case of FIGS. 19A to 19D, the maximum total lighting period length is set to 90% of one field period, which is even wider than in the balanced mode. The reason for this is that the screen contains even more flicker component.

In the case of this example, a non-lighting period is always provided in the range between the 90% and 100% marks of one field period.

It should be noted that if the total lighting period length is extremely short (FIG. 19A), only one lighting period is provided, and the length of this lighting period is varied.

Incidentally, if the total lighting period length is greater than the set length, seven lighting periods are provided per field period.

In this case, the start timing of the first lighting period is fixed to 0% of one field period, and the end timing of the seventh lighting period to 90% thereof.

It should be noted that, in the case of this setting example, the lengths of the non-lighting periods provided between the lighting periods are all set at the same ratio.

In this case, if the total lighting period length increases, the lengths of the lighting periods change in a symmetrical manner relative to the 45% mark of one field period which is the center of the variable range and which coincides with the center of the fourth lighting period.

Naturally, the lighting periods change in length while maintaining their 1:1.25:1.5:2.5:1.5:1.25:1 ratio. Then, when the total lighting period length reaches its maximum (FIG. 19D), all the lighting periods combine into a single period.

At this time, if the total lighting period length is given as A % of one field period, the lighting and non-lighting period lengths are given by the formulas shown below.

In the following formulas, the length of each of the first and seventh lighting periods is T1, the length of each of the second and sixth lighting periods T2, the length of each of the third and fifth lighting periods T3, and the length of the fourth lighting period T4. Further, the length of each of the non-lighting periods is T5.

$$T1 = A\,\%/10$$

$$T2 = (A\,\%/10)*1.25$$

$$T3 = (A\,\%/10)*1.5$$

$$T4 = (A\,\%/10)*2.5$$

$$T5 = (85\% - A\%)/6$$

It should be noted that the display performance can be adjusted by changing the lengths of the non-lighting periods even with the lengths of the lighting periods left unchanged. For example, if the spacing (non-lighting period) between the first and second lighting periods and that between the seventh and sixth lighting periods can be increased in an equidistant manner and if the spacing (non-lighting period) between the third and fourth lighting periods and that between the fifth and fourth lighting periods can be reduced in an equidistant manner, the flicker visibility can be reduced in exchange for a slight reduction in motion image display performance.

In this case, the non-lighting period lengths can be given, for example, by the formulas shown below.

$$T5 = ((75\% - A\,\%)/6)*1.25$$

$$T6 = (75\% - A\,\%)/6$$

$$T7 = ((75\% - A\,\%)/6)*0.75$$

(C) Other Embodiments

(C-1) Method 1 of Changing Lighting Period Lengths

In the embodiments described above, the cases were described in which the start timing of the first lighting period and the end timing of the Nth lighting periods were fixed.

That is, the cases were described in which the start timing of the first lighting period was set to 0% of one field period, and the end timing of the Nth lighting period to the maximum total lighting period length.

However, the start timing of the first lighting period and the end timing of the Nth lighting period may also be varied as with other lighting periods.

FIGS. 20A to 20D illustrate setting examples when the lighting period count N is three. FIGS. 20A to 20D illustrate examples in which the lengths of the lighting periods are set at a 1:2:1 ratio in order of appearance, from earliest to latest. We assume that the maximum total lighting period length is set to 60% of one field period. In this case, 15% is assigned to the first and third lighting periods, and 30% to the second lighting period.

In FIGS. 20A to 20D, therefore, the start and end timings of the first lighting period are set with the 7.5% mark at the center. The start and end timings of the second lighting period are set with the 30% mark at the center. The start and end timings of the third lighting period are set with the 52.5% mark at the center.

In this case, the apparent lighting periods are varied in the range between 45% and 60% according to the total lighting period length. Therefore, there is no likelihood of flicker being perceived. Further, this provides at least 40% non-lighting period and a maximum of approximately 55% continuous non-lighting period, thus ensuring enhanced motion image response.

(C-2) Method 2 of Changing Lighting Period Lengths

In the embodiment described above, the cases were described in which the start timing of the first lighting period was set to 0% of one field period, and the end timing of the Nth lighting period to the maximum total lighting period length.

However, the variable range of lighting period lengths may be set anywhere within one field period.

FIGS. 21A to 21D illustrate cases in which the variable range of lighting period lengths is offset.

FIGS. 21A to 21D illustrate setting examples when the lighting period count N is three.

It should be noted that the examples shown in FIGS. 21A to 21D are associated with the cases in which the total lighting period length is 60%. The lighting periods are provided in the range between the 20% and 80% marks of one field period. Even in the setting methods shown in FIGS. 21A to 21D, 40% of one field period is always reserved as a fixed non-lighting period.

(C-3) Other Lighting Period Setting Operation

In the embodiments given earlier, the cases were described in which the light emission mode was set based on the feature components detected from the display image. However, an arrangement may be used which adjusts the determination threshold for light emission mode based on the type of input image data.

Among possible types of input image data here are movies, computer images and television programs.

(C-4) Examples of Other Display Devices

The lighting period setting method described above is applicable to display panels other than organic EL panels. For example, the method is also applicable to an inorganic EL panel, a display panel having LEDs arranged therein, and a self-luminous display panel with EL elements having a diode structure arranged on the screen.

The lighting period setting method described above is also applicable to a liquid crystal display panel using EL elements as its backlight source and further to non-self-luminous display panels.

Figure 22:
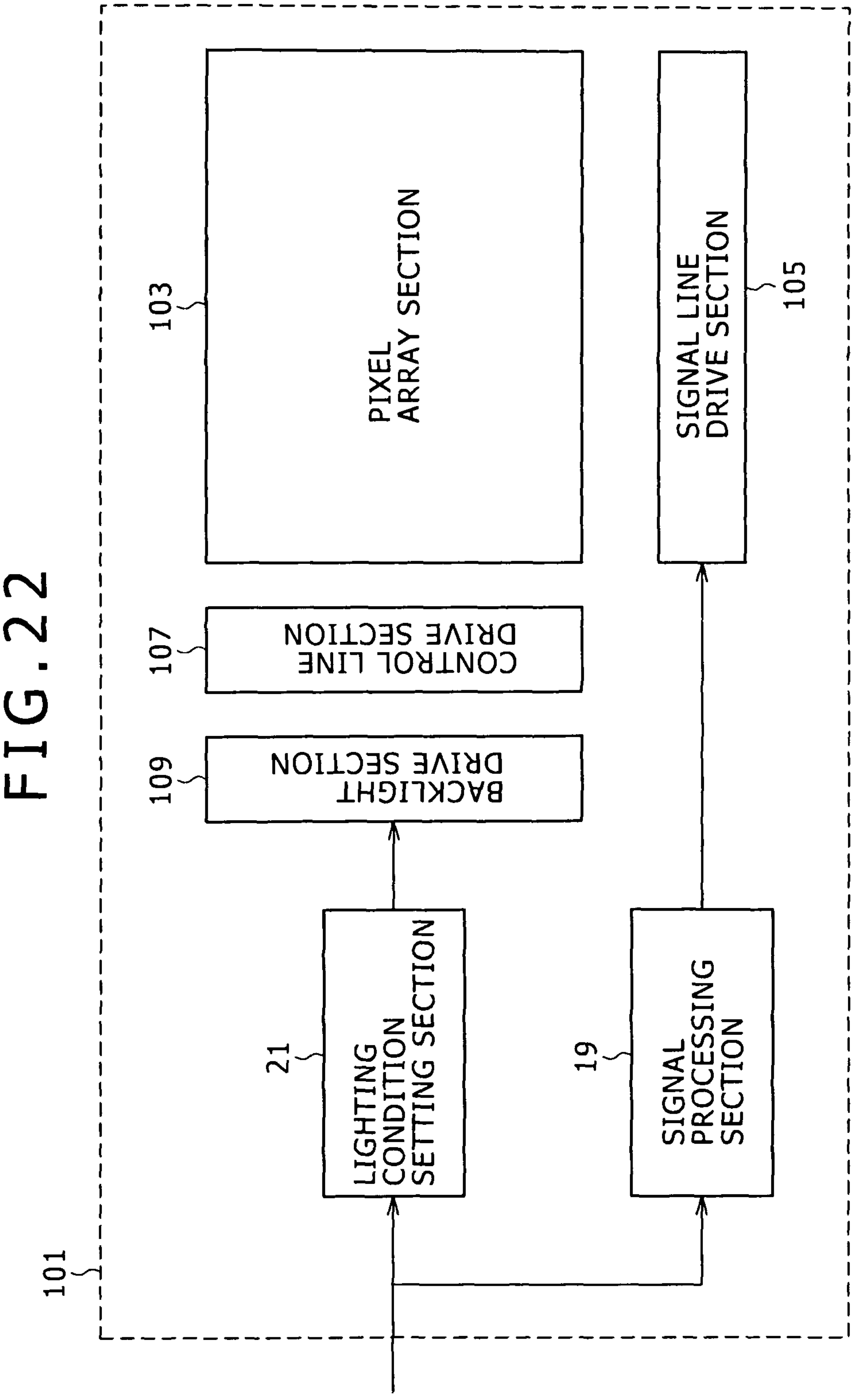
FIG. 22 is a diagram illustrating a system configuration example of a liquid crystal panel.

FIG. 22 illustrates a system configuration example of a liquid crystal panel 101. It should be noted that, in FIG. 22, like components as those in FIG. 4 are designated by the same reference numerals.

The liquid crystal panel 101 shown in FIG. 22 includes a pixel array section 103, a signal line drive section 105 configured to drive the signal line DTL, a control line drive section 107 configured to drive the write control line WSL, the signal processing section 19, the lighting condition setting section 21 and a backlight drive section 109. These components are arranged on a glass substrate. Also in this case, only some of the circuit sections may be provided on the glass substrate, with the remaining circuits provided on a separate substrate.

Figure 23:
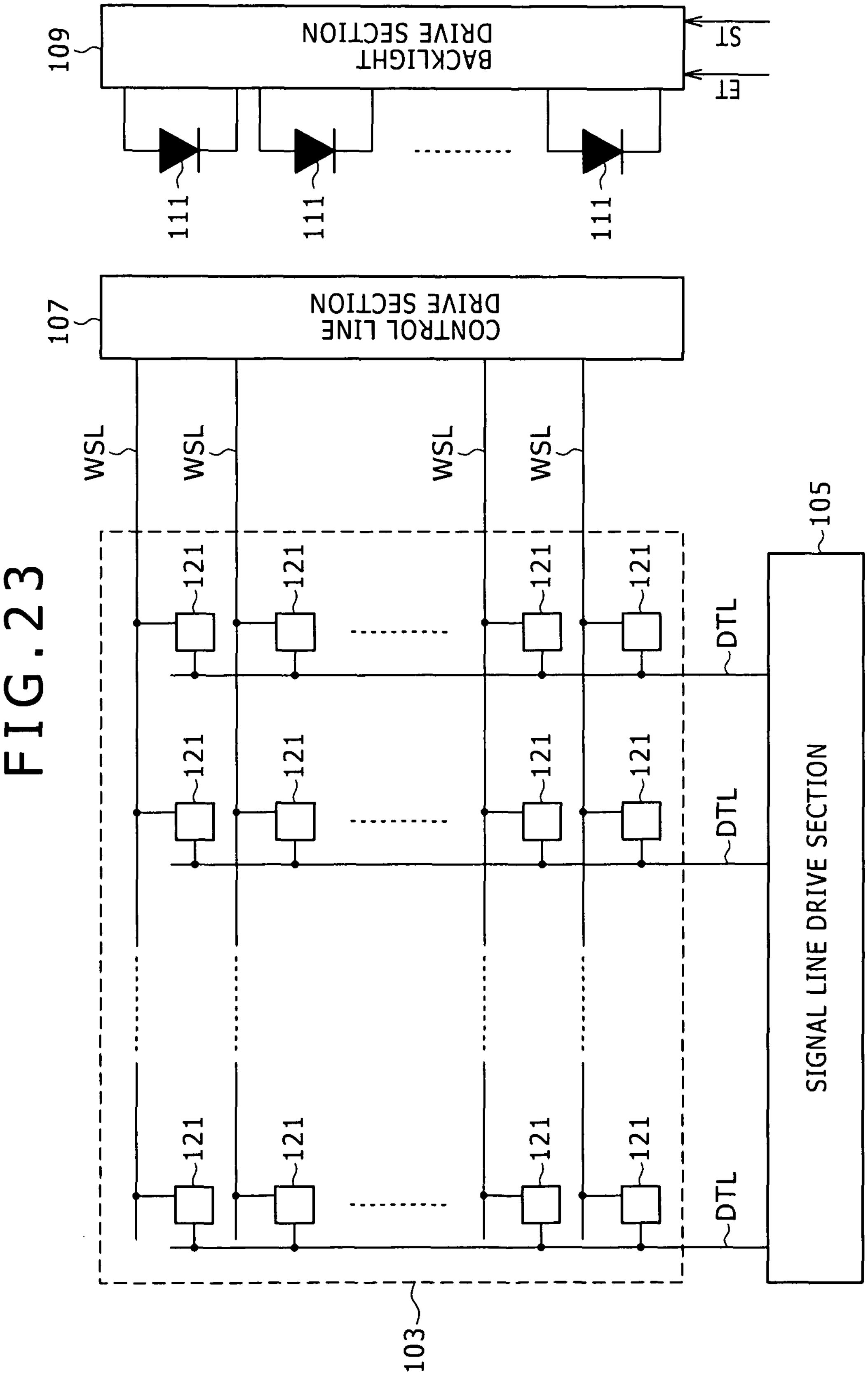
FIG. 23 is a diagram describing the connection relationship between LEDs (Light Emitting Diode) and a backlight drive section.

FIG. 23 illustrates the connection relationship between the pixel array section 103 and its peripheral circuits. The signal line drive section 105 and control line drive section 107 are provided around the pixel array section 103 to drive the pixel array section 103.

The pixel array section 103 has subpixels 121 arranged in a matrix form to serve as a liquid crystal shutter. In this case, the subpixels 121 control the passage (and interruption) of light from the backlight based on the signal potential Vsig associated with gray level information.

Figure 24:
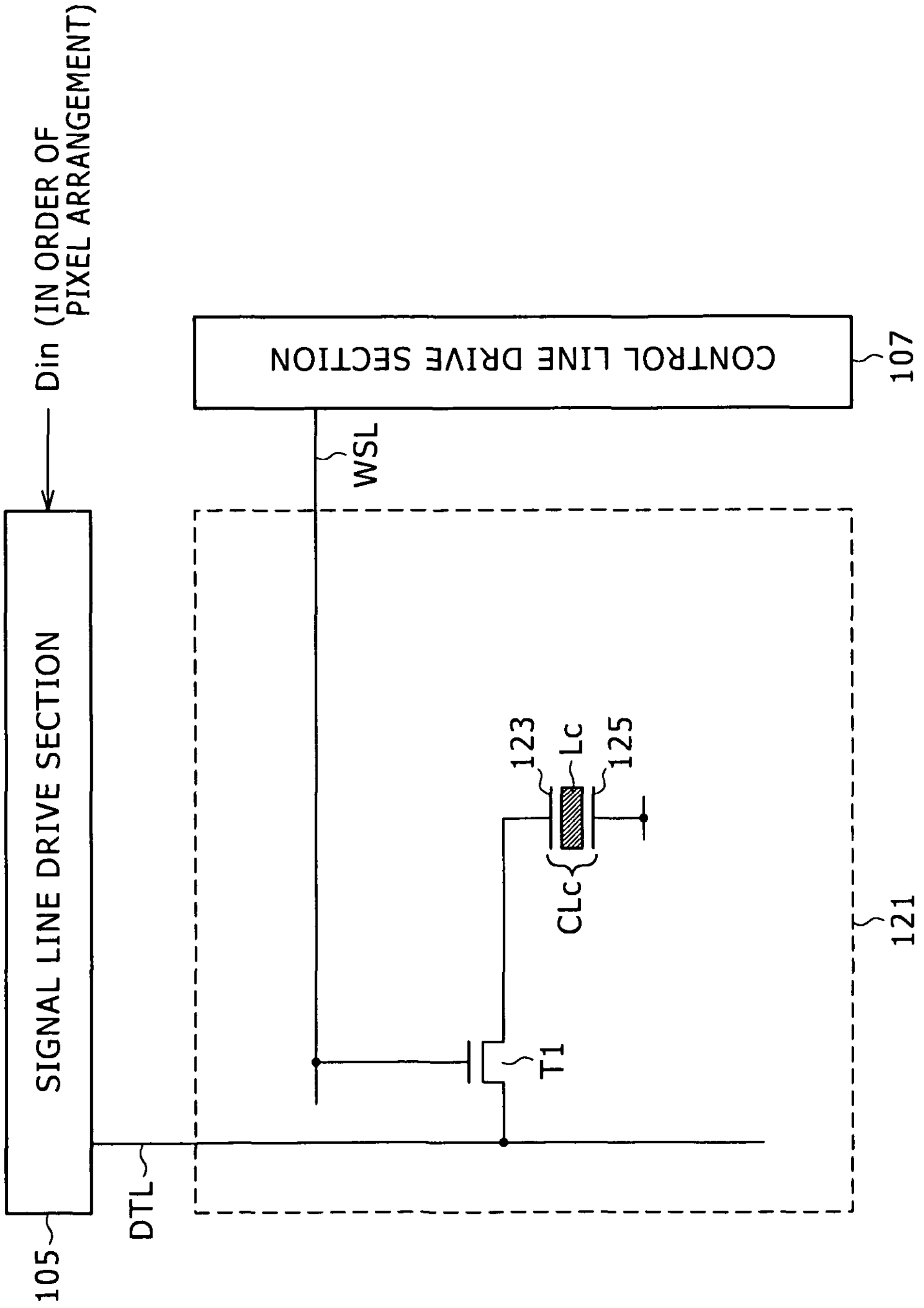
FIG. 24 is a diagram describing the connection relationship between a pixel circuit and drive sections.

FIG. 24 illustrates the structure of the subpixel 121. The subpixel 121 includes the thin film transistor T1 (hereinafter referred to as the sampling transistor) and a liquid crystal capacitor CLc configured to hold the signal potential Vsig. Here, the liquid crystal capacitor CLc includes liquid crystal Lc sandwiched between a pixel electrode and an opposed electrode 123 and 125.

The signal line drive section 105 is a circuit device configured to apply the signal potential Vsig to the signal line DTL to which one of the main electrodes of the sampling transistor T1 is connected. On the other hand, the control line drive section 107 is a circuit device configured to drive the write control line WSL connected to the gate electrode of the sampling transistor T1 by a binary potential.

The backlight drive section 109 is a circuit device configured to drive LEDs 111 based on drive pulses (start pulse ST and end pulse ET) supplied from the lighting condition setting section 21. The backlight drive section 109 operates in such a manner as to supply a drive current to the LEDs 111 during the lighting periods and shut off the supply of the drive current thereto during the non-lighting periods. The backlight drive section 109 here can be implemented, for example, in the form of a switch connected in series to the current supply line.

(C-5) Product Examples (Electronic Equipment)

In the description given above, the present invention was described taking as an example an organic EL panel incorporating the lighting period setting function according to the embodiments. However, an organic EL panel or any other type of display panel incorporating this type of setting function may be in circulation in a form installed in a variety of electronic equipment. Examples of installation in other piece of electronic equipment will be given below.

Figure 25:
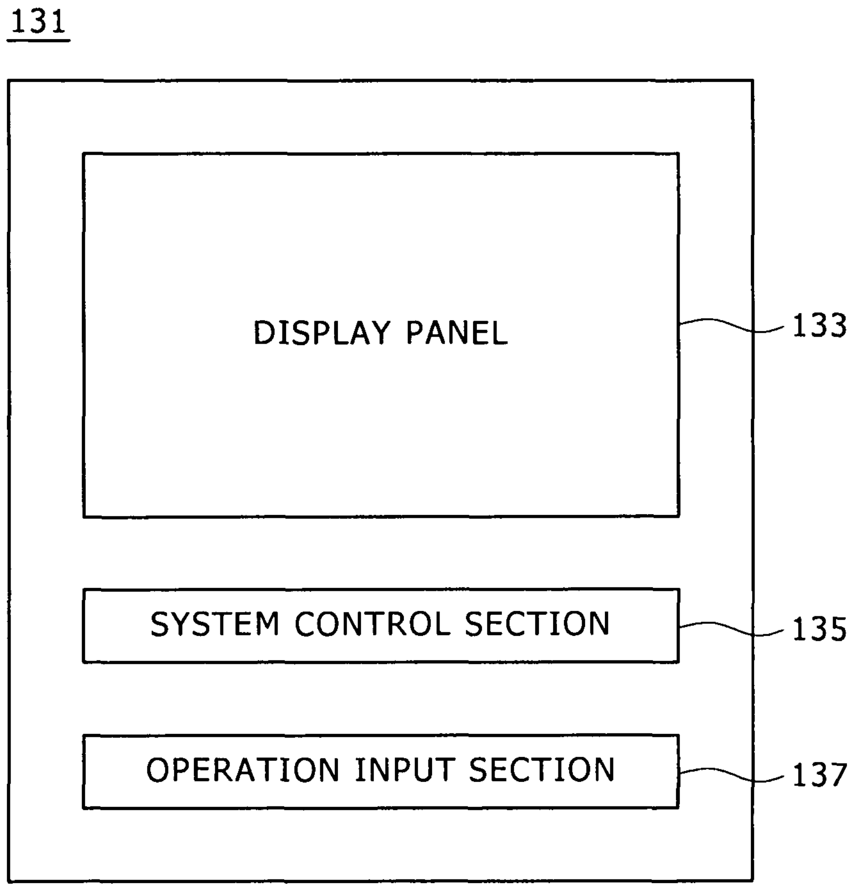
FIG. 25 is a diagram illustrating an example of functional configuration of electronic equipment.

FIG. 25 illustrates a conceptual example of configuration of electronic equipment 131. The electronic equipment 131 includes a display panel 133 incorporating the lighting period setting function described above, system control section 135 and operation input section 137. The nature of processing performed by the system control section 135 varies depending on the product type of the electronic equipment 131. On the other hand, the operation input section 137 is a device configured to accept operation inputs to the system control section 135. Mechanical interfaces such as switches and buttons and graphical interfaces are, for example, used as the operation input section 137.

It should be noted that the electronic equipment 131 is not limited to equipment designed for use in a specific field so long as it is capable of displaying an image or video generated inside or fed to the electronic equipment.

Figure 26:
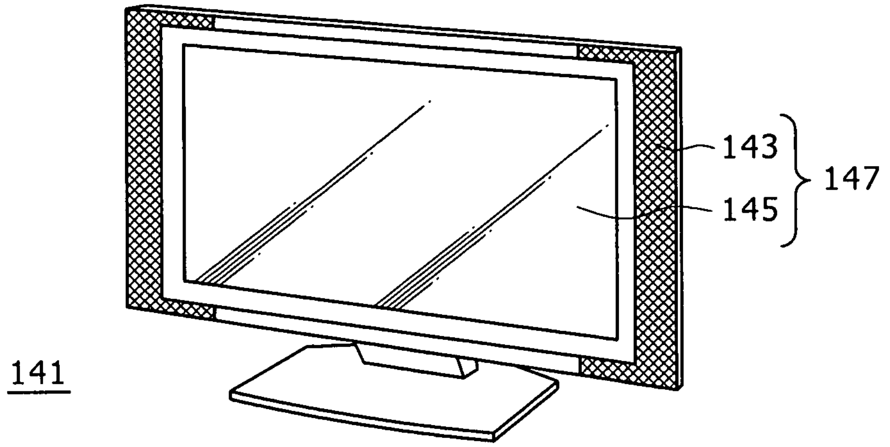
FIG. 26 is a view illustrating a product example of electronic equipment.

FIG. 26 illustrates an appearance example when other piece of electronic equipment is a television set. A television set 141 has a display screen 147 on the front surface of its enclosure. The display screen 147 includes a front panel 143, filter glass 145 and other parts. The display screen 147 corresponds to the display panel 133.

Figure 27A:
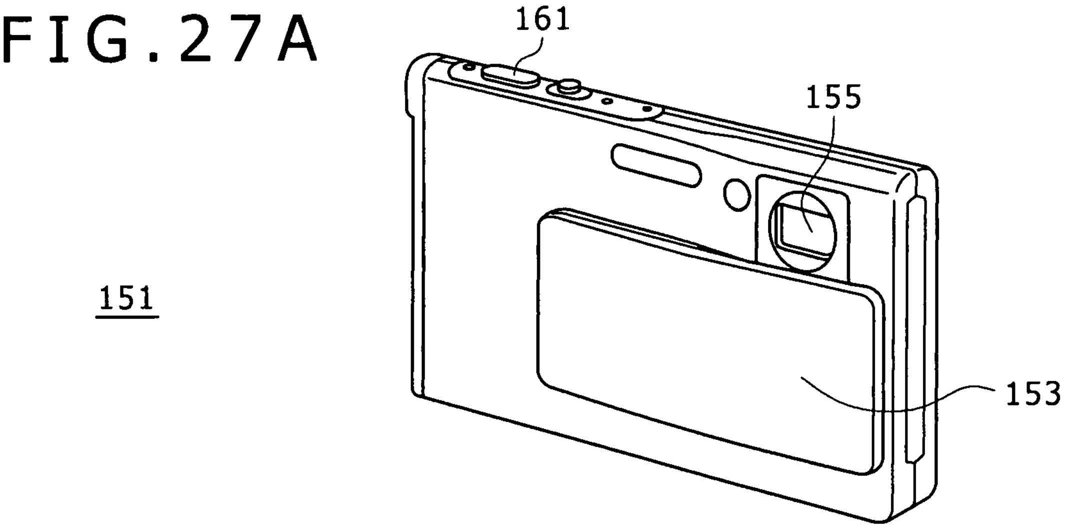
FIGS. 27A and 27B are views illustrating another product example of electronic equipment.
Figure 27B:
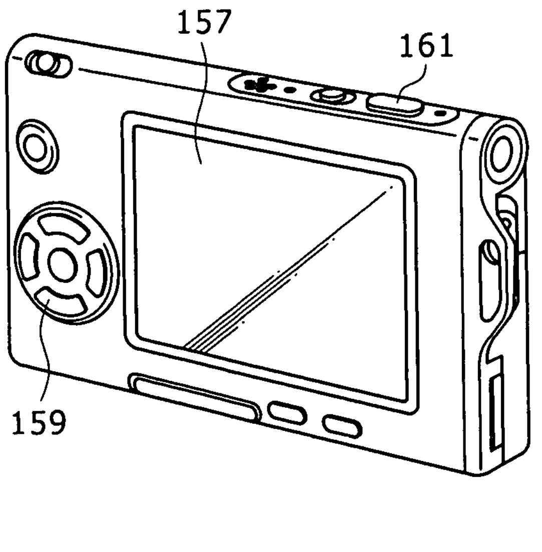

Further, the electronic equipment 131 may be, for example, a digital camera. FIGS. 27A and 27B illustrate an appearance example of a digital camera 151. FIG. 27A is an appearance example of the digital camera as seen from the front (as seen from the subject), and FIG. 27B is an appearance example thereof as seen from the rear (as seen from the photographer).

The digital camera 151 includes a protective cover 153, imaging lens section 155, display screen 157, control switch 159 and shutter button 161. Of these, the display screen 157 corresponds to the display panel 133.

Figure 28:
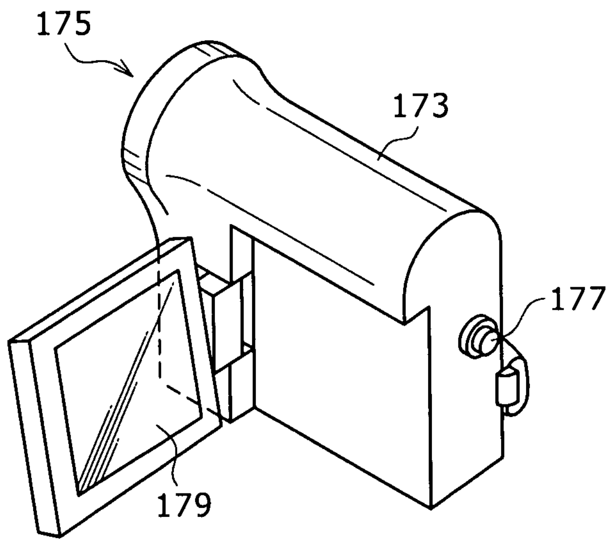
FIG. 28 is a view illustrating still another product example of electronic equipment.

Still further, the electronic equipment 131 may be, for example, a video camcorder. FIG. 28 illustrates an appearance example of a video camcorder 171.

The video camcorder 171 includes an imaging lens 175 provided to the front of a main body 173, imaging start/stop switch 177 and display screen 179. Of these, the display screen 179 corresponds to the display panel 133.

Figure 29A:
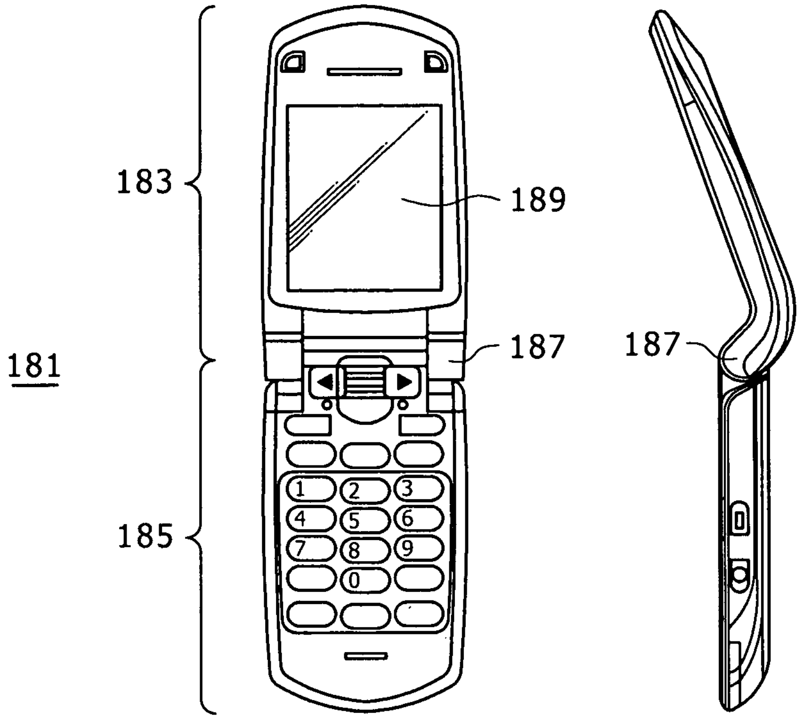
FIGS. 29A and 29B are views illustrating still another product example of electronic equipment.
Figure 29B:
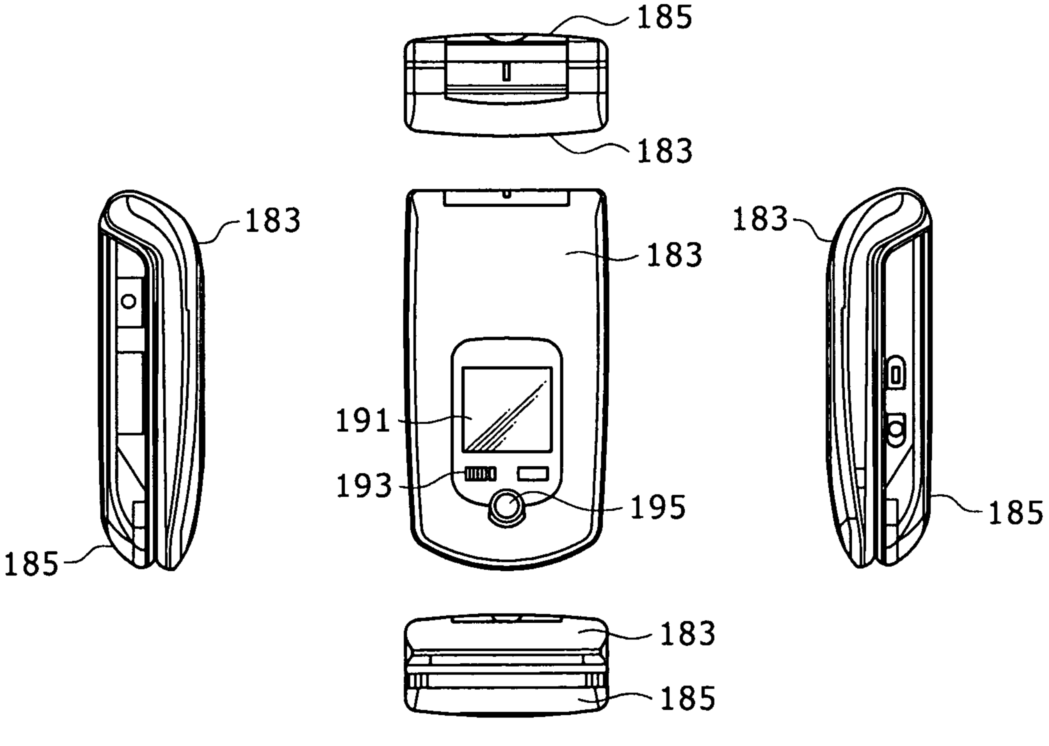

Still further, the electronic equipment 131 may be, for example, a personal digital assistant. FIGS. 29A and 29B illustrate an appearance example of a mobile phone 181 as a personal digital assistant. The mobile phone 181 shown in FIGS. 29A and 29B is a folding mobile phone. FIG. 29A is an appearance example of the mobile phone in an open position. FIG. 29B is an appearance example of the mobile phone in a folded position.

The mobile phone 181 includes an upper enclosure 183, lower enclosure 185, connecting section (hinge section in this example) 187, display screen 189, subdisplay screen 191, picture light 193 and imaging lens 195. Of these, the display screen 189 and subdisplay screen 191 correspond to the display panel 133.

Figure 30:
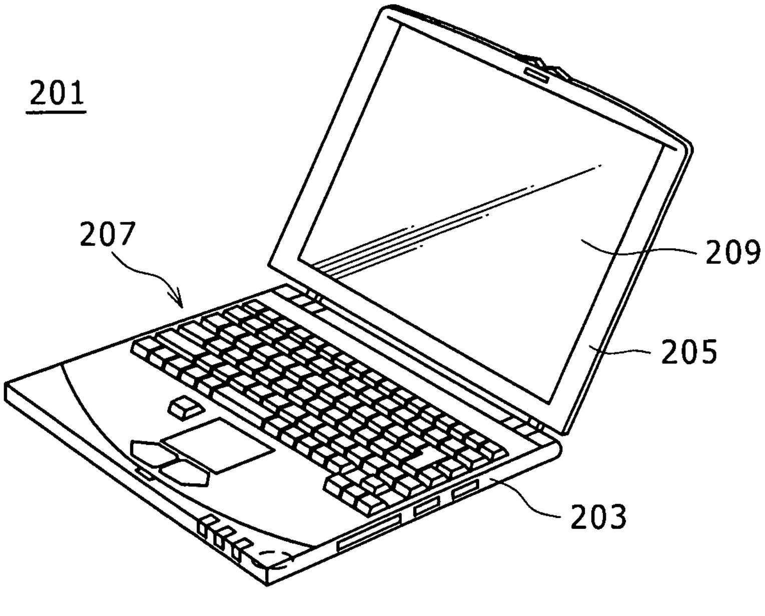
FIG. 30 is a view illustrating still another product example of electronic equipment.

Still further, the electronic equipment 131 may be, for example, a personal computer. FIG. 30 illustrates an appearance example of a laptop personal computer 201.

The laptop personal computer 201 includes a lower enclosure 203, upper enclosure 205, keyboard 207 and display screen 209. Of these, the display screen 209 corresponds to the display panel 133.

In addition to the above, the electronic equipment 131 may be, for example, an audio player, gaming machine, electronic book or electronic dictionary.

(C-6) Other Example of Pixel Circuit

In the description given above, examples of pixel circuit (FIGS. 6 and 24) for use in an active-matrix-driven organic EL panel were described.

However, the pixel circuit configuration is not limited thereto. The present invention is also applicable to a variety of pixel circuit configurations now existing, or to be proposed in the future.

(C-7) Others

The embodiments described above may be modified in various manners without departing from the scope of the invention. Also, various modifications and applications may be possible which are created or combined based on the disclosure of the invention.

What is claimed is:

1. A lighting period setting method for a display panel which permits control of a peak luminance level for a field period by controlling a total lighting period length which is the sum of all lighting periods in the field period, the lighting period setting method comprising the steps of, for a given field period:

calculating a total average luminance level based on image data by averaging the luminance levels of pixels in N frames of an image to be displayed, wherein at least one of the N frames includes the frame to be displayed during the given field period;

setting the total lighting period length for the given field period based on the total average luminance level;

selecting a light emission mode for the given field period from a plurality of light emission modes based on the image data and the total average luminance level;

determining setting conditions for the light emission mode; and setting, for the given field period, the number, arrangement and lengths of lighting periods according to the setting conditions and the total lighting period length so as to provide the peak luminance level, wherein the plurality of light emission modes includes:

a still image mode;

a motion image emphasis mode;

a balanced mode; and a flicker emphasis mode, wherein the frame to be displayed during the given field period comprises a plurality of blocks, each block including a plurality of pixels, the method further comprising the steps of:

calculating a block average luminance level for each block by averaging the luminance levels of the pixels of the respective block;

detecting any blocks that have a block average luminance level greater than a predetermined luminance threshold value;

detecting any regions that are larger than a predetermined size threshold, wherein the regions consist of contiguous blocks that have been detected to have a block average luminance level greater than the predetermined luminance threshold value; and detecting a flicker component level in the frame to be displayed during the given field period based on the size of the largest detected region and the number of detected regions; and wherein, when the flicker emphasis mode is selected, the setting conditions are based on the detected flicker component level.

2. The lighting period setting method of claim 1, further comprising:

driving a pixel array section so as to provide the set lighting periods.

3. The lighting period setting method of claim 1, further comprising:

driving a backlight so as to provide the set lighting periods.

4. A lighting condition setting device comprising:

a luminance level calculation portion configured to calculate a total average luminance level for a given field period based on input image data by averaging the luminance levels of pixels in N frames of an image to be displayed, wherein at least one of the N frames includes the frame to be displayed during the given field period;

a total lighting period length setting unit configured to set the total lighting period length for the given field period based on the total average luminance level a light emission mode selecting unit configured to select a light emission mode for the given field period from a plurality of light emission modes based on the image data and the total average luminance level; and a lighting period setting unit configured to determine setting conditions for the light emission mode and set the number, arrangement and lengths of lighting periods per field period according to the setting conditions and the total lighting period length so as to provide a peak luminance level which is set according to the input image data, wherein the plurality of light emission modes includes:

a still image mode;

a motion image emphasis mode;

a balanced mode; and a flicker emphasis mode, wherein the frame to be displayed during the given field period comprises a plurality of blocks, each block including a plurality of pixels, and the lighting period setting unit is configured to:

calculate a block average luminance level for each block by averaging the luminance levels of the pixels of the respective block;

detect any blocks that have a block average luminance level greater than a predetermined luminance threshold value;

detect any regions that are larger than a predetermined size threshold, wherein the regions consist of contiguous blocks that have been detected to have a block average luminance level greater than the predetermined luminance threshold value; and detect a flicker component level in the frame to be displayed during the given field period based on the size of the largest detected region and the number of detected regions; and wherein, when the flicker emphasis mode is selected, the lighting period setting unit determines the setting conditions based on the detected flicker component level.

5. The lighting condition setting device of claim 4, wherein the device is a semiconductor device.

6. A display panel whose peak luminance level is variably controlled by controlling the total lighting period length which is the sum of all lighting periods per field period, the display panel comprising:

a pixel array section having a pixel structure appropriate for active matrix driving;

a luminance level calculation portion configured to calculate a total average luminance level for a given field period based on input image data by averaging the luminance levels of pixels in N frames of an image to be displayed, wherein at least one of the N frames includes the frame to be displayed during the given field period;

a total lighting period length setting unit configured to set the total lighting period length for the given field period based on the total average luminance level a light emission mode selecting unit configured to select a light emission mode for the given field period from a plurality of light emission modes based on the image data and the total average luminance level;

a lighting period setting unit configured to determine setting conditions for the light emission mode and set the number, arrangement and lengths of lighting periods per field period according to the setting conditions and the total lighting period length so as to provide a peak luminance level which is set according to the input image data; and a panel drive section configured to drive the pixel array section so as to provide the set lighting periods, wherein the plurality of light emission modes includes:

a still image mode;

a motion image emphasis mode;

a balanced mode; and a flicker emphasis mode, wherein the frame to be displayed during the given field period comprises a plurality of blocks, each block including a plurality of pixels, and the lighting period setting unit is configured to:

calculate a block average luminance level for each block by averaging the luminance levels of the pixels of the respective block;

detect any blocks that have a block average luminance level greater than a predetermined luminance threshold value;

detect any regions that are larger than a predetermined size threshold, wherein the regions consist of contiguous blocks that have been detected to have a block average luminance level greater than the predetermined luminance threshold value; and detect a flicker component level in the frame to be displayed during the given field period based on the size of the largest detected region and the number of detected regions; and wherein, when the flicker emphasis mode is selected, the lighting period setting unit determines the setting conditions based on the detected flicker component level.

7. The display panel of claim 6, wherein the pixel array section has a pixel structure in which electro luminescence elements are arranged in a matrix form, and the panel drive section sets the lighting periods of the electro luminescence elements.

8. The display panel of claim 6, further comprising:

a backlight drive section configured to drive a backlight source so as to provide the set period length.

9. Electronic equipment comprising:

a pixel array section having a pixel structure appropriate for active matrix driving, the pixel array section whose peak luminance level is variably controlled by controlling the total lighting period length which is the sum of all lighting periods per field period;

a luminance level calculation portion configured to calculate a total average luminance level for a given field period based on input image data by averaging the luminance levels of pixels in N frames of an image to be displayed, wherein at least one of the N frames includes the frame to be displayed during the given field period;

a total lighting period length setting unit configured to set the total lighting period length for the given field period based on the total average luminance level a light emission mode selecting unit configured to select a light emission mode for the given field period from a plurality of light emission modes based on the image data and the total average luminance level; and a lighting period setting unit configured to determine setting conditions for the light emission mode and set the number, arrangement and lengths of lighting periods per field period according to the setting conditions and the total lighting period length so as to provide a peak luminance level which is set according to the input image data;

a panel drive section configured to drive the pixel array section so as to provide the set lighting periods;

a system control section; and an operation input section for the system control section, wherein the plurality of light emission modes includes:

a still image mode;

a motion image emphasis mode;

a balanced mode; and a flicker emphasis mode, wherein the frame to be displayed during the given field period comprises a plurality of blocks, each block including a plurality of pixels, and the lighting period setting unit is configured to:

calculate a block average luminance level for each block by averaging the luminance levels of the pixels of the respective block;

detect any blocks that have a block average luminance level greater than a predetermined luminance threshold value;

detect any regions that are larger than a predetermined size threshold, wherein the regions consist of contiguous blocks that have been detected to have a block average luminance level greater than the predetermined luminance threshold value; and detect a flicker component level in the frame to be displayed during the given field period based on the size of the largest detected region and the number of detected regions; and wherein, when the flicker emphasis mode is selected, the lighting period setting unit determines the setting conditions based on the detected flicker component level.

10. The electronic equipment of claim 9 further comprising:

a backlight source whose peak luminance level is varied by controlling the total lighting period length which is the sum of all lighting periods per field period; and a backlight drive section configured to drive the backlight source so as to provide the set period length.

11. A lighting period setting method for a display panel which permits control of a peak luminance level for a field period by controlling a total lighting period length which is the sum of all lighting periods in the field period, the lighting period setting method comprising the steps of, for a given field period:

calculating a total average luminance level based on image data by averaging the luminance levels of pixels in N frames of an image to be displayed, wherein at least one of the N frames includes the frame to be displayed during the given field period;

setting the total lighting period length for the given field period based on the total average luminance level;

selecting a light emission mode for the given field period from a plurality of light emission modes based on the image data and the total average luminance level;

determining setting conditions for the light emission mode;

setting, for the given field period, the number, arrangement and lengths of lighting periods according to the setting conditions and the total lighting period length so as to provide the peak luminance level; and detecting a motion amount of the image to be displayed, based on the image signal data, wherein the plurality of light emission modes includes:

a still image mode;

a motion image emphasis mode;

a balanced mode; and
a flicker emphasis mode,
wherein the still image mode is selected when the detected motion amount is less than a first predetermined value, and
wherein, when the detected motion amount is greater than the first predetermined value:
the motion image emphasis mode is selected when the calculated average luminance is less than a second predetermined value,
the balanced mode is selected when the calculated average luminance is greater than the second predetermined value and less than a third predetermined value, the third predetermined value being greater than the second predetermined value, and
the flicker emphasis mode is selected when the calculated average luminance is greater than the third predetermined value,
wherein the setting conditions are determined such that:
when the motion image emphasis mode is selected, the lighting periods are arranged within the given field period within a first range, the length of which is less than a first maximum value that is less than the length of the given field period;
when the balanced mode is selected, the lighting periods are arranged within the given field period within a second range, the length of which equals a second maximum value that is greater than the first maximum value and less than the length of the given field period; and
when the flicker emphasis mode is selected, the lighting periods are arranged within the given field period within a third range, the length of which is less than a third maximum value that is greater than the second maximum value and less than the length of the given field period,
wherein the motion emphasis mode comprises a plurality of motion emphasis setting levels and the flicker emphasis mode comprises a plurality of flicker emphasis setting levels, the method further comprising:
detecting a flicker component level;
when the motion emphasis mode has been selected, selecting a motion emphasis setting level from the plurality of motion emphasis setting levels according to the detected motion amount; and
when the flicker emphasis mode has been selected, selecting a flicker emphasis setting level from the plurality of flicker emphasis setting levels according to the detected flicker component level;
wherein the setting conditions are determined according to the selected motion emphasis setting level in the motion emphasis mode and according to the selected flicker emphasis setting level in the flicker emphasis mode.

12. The lighting period setting method of claim 11, wherein the frame to be displayed during the given field period comprises a plurality of blocks, each block including a plurality of pixels, the method further comprising the steps of:
calculating a block average luminance level for each block by averaging the luminance levels of the pixels of the respective block;
detecting any blocks that have a block average luminance level greater than a predetermined luminance threshold value;
detecting any regions that are larger than a predetermined size threshold, wherein the regions consist of contiguous blocks that have been detected to have a block average luminance level greater than the predetermined luminance threshold value; and
detecting the flicker component level based on at least one of the size of the largest detected region and the number of detected regions.

13. The lighting period setting method of claim 11, wherein the setting conditions are determined such that:
when the still image mode is selected,
when the total lighting period length is less than a still image threshold value, there is only one lighting period in the given field period, beginning at the start of the given field period, and
when the total lighting period length is greater than or equal to the still image threshold value, there are two lighting periods of equal length in the given field period, one of which begins at the start of the given field period and the other of which starts at 50% of the given field period.

14. The lighting period setting method of claim 11, wherein the setting conditions are determined such that when the motion image emphasis mode is selected,
there is only one lighting period in the given field period when a motion emphasis setting level corresponding to a largest detected motion amount is selected, and
there are M>1 lighting periods in the given field period when a motion emphasis setting level corresponding to a detected motion amount smaller than the largest detected motion amount is selected, wherein
the M lighting periods are arranged symmetrically about the center of the first range with no-light periods in between each lighting period,
the length of each of the M lighting periods is set such that a first fixed symmetric ratio of lengths is maintained and the length of each lighting period closer to the center of the first range is greater than the lengths of any lighting period further from the center of the first range, and
the length of each no-light period that is interposed between lighting periods of the given field period is set such that a second fixed symmetric ratio of lengths is maintained and the length of each no-light period closer to the center of the first range is less than the lengths of any no-light period further from the center of the first range;
when the balanced mode is selected,
there are M>1 lighting periods in the given field period, wherein
the M lighting periods are arranged symmetrically about the center of the second range with no-light periods in between each lighting period,
the length of each of the M lighting periods is set such that a third fixed symmetric ratio of lengths is maintained and the length of each lighting period closer to the center of the second range is greater than the lengths of any lighting period further from the center of the second range, and
the length of each no-light period that is interposed between lighting periods of the given field are equal; and
when the flicker emphasis mode is selected,
there are M>1 lighting periods in the given field period, wherein
the M lighting periods are arranged symmetrically about the center of the third range with no-light periods in between each lighting period, the length of each of the M lighting periods is set such that a fourth fixed symmetric ratio of lengths is maintained and the length of each lighting period closer to the center of the third range is greater than the lengths of any lighting period further from the center of the third range, and the length of each no-light period that is interposed between lighting periods of the given field period is set such that a fifth fixed symmetric ratio of lengths is maintained and the length of each no-light period closer to the center of the third range is greater than or equal to the lengths of any no-light period further from the center of the first range;

wherein a largest term of the first ratio is larger than or equal to a largest term of the third ratio, which is larger than a largest term of the fourth ratio, such that for any given total lighting period, the longest lighting period of the motion image emphasis mode is longer than or equal to the longest lighting period of the balanced mode, which is longer than the longest lighting period of the flicker emphasis mode.

15. The lighting period setting method of claim 14, wherein the setting conditions are determined such that:

the length of the first range is larger when a motion emphasis setting level corresponding to a comparatively small detected motion amount is set than the length of the first range when a motion emphasis setting level corresponding to a comparatively large detected motion amount is set; and the length of the third range is larger when a flicker emphasis setting level corresponding to a comparatively large detected flicker component level is set than the length of the third range when a flicker emphasis setting level corresponding to a comparatively small detected flicker component level is set.

16. The lighting period setting method of claim 14, wherein, whenever there are more than one lighting periods in the given field period, the first lighting period begins at the beginning of the corresponding range and the second lighting period ends at the end of the corresponding range.

17. The lighting period setting method of claim 11, wherein the first maximum value is 75% of the given field period, the second maximum value is 85% of the given field period, and the third maximum value is 90% of the given field period.

18. The lighting period setting method of claim 1, wherein the total lighting period length is set such that the magnitude of the total lighting period length is inversely related to the magnitude of the total average luminance level.

* * * * *